United States Patent
Frutschy et al.

(10) Patent No.: US 8,901,463 B2
(45) Date of Patent: Dec. 2, 2014

(54) THERMAL MANAGEMENT DEVICE

(75) Inventors: Kristopher John Frutschy, Schenectady, NY (US); Mehmet Demiroglu, Troy, NY (US); Roger Bull, Needwood (GB); Paul Sudworth, Burton Upon Trent (GB); Mathew Maury, Cicero, NY (US)

(73) Assignee: General Electric Company, Schenectady, NY (US)

( * ) Notice: Subject to any disclaimer, the term of this patent is extended or adjusted under 35 U.S.C. 154(b) by 414 days.

(21) Appl. No.: 13/234,942

(22) Filed: Sep. 16, 2011

(65) Prior Publication Data

US 2013/0068755 A1    Mar. 21, 2013

(51) Int. Cl.
| | |
|---|---|
| *H05B 3/06* | (2006.01) |
| *H05B 3/20* | (2006.01) |
| *H05B 3/14* | (2006.01) |
| *H01M 10/6571* | (2014.01) |
| *F26B 3/30* | (2006.01) |

(52) U.S. Cl.
CPC ..... *H01M 10/5083* (2013.01); *H05B 2203/004* (2013.01); *H05B 3/20* (2013.01); *H05B 2203/014* (2013.01); *H05B 3/141* (2013.01)
USPC .......................................... 219/542; 392/407

(58) Field of Classification Search
USPC ................. 219/268, 546, 528–9, 548, 552–3; 392/407
See application file for complete search history.

(56) References Cited

U.S. PATENT DOCUMENTS

| | | | |
|---|---|---|---|
| 4,105,413 | A | 8/1978 | Stahl |
| 4,229,687 | A | 10/1980 | Newman |
| 6,002,240 | A | 12/1999 | McMahan et al. |
| 6,216,334 | B1 | 4/2001 | Hughes |
| 6,753,651 | B1 | 6/2004 | Goral |
| 6,884,974 | B2 | 4/2005 | Howard et al. |
| 7,049,560 | B2 | 5/2006 | Fukuda et al. |
| 7,947,925 | B2 | 5/2011 | Suzuki et al. |
| 7,964,827 | B2 | 6/2011 | Suzuki et al. |
| 8,137,097 | B2 | 3/2012 | Gunther et al. |
| 2007/0167304 | A1 | 7/2007 | Selle et al. |
| 2009/0297132 | A1* | 12/2009 | Abbott .......................... 392/407 |

FOREIGN PATENT DOCUMENTS

| | | |
|---|---|---|
| DE | 826780 C | 2/1952 |
| DE | 7601161 U1 | 7/1976 |
| DE | 8634784 U1 | 2/1987 |
| DE | 202007014964 U1 | 2/2009 |
| JP | 11169720 A | 6/1999 |
| KR | 20110001398 U | 2/2011 |

OTHER PUBLICATIONS

Search Report and Written Opinion from corresponding PCT Application No. PCT/US2012/054541 dated Dec. 17, 2012.

* cited by examiner

*Primary Examiner* — Shawntina Fuqua
(74) *Attorney, Agent, or Firm* — GE Global Patent Operation; Peter T. DiMauro

(57) ABSTRACT

A thermal management device is presently disclosed. The thermal management device includes an insulator with a maximum use temperature of at least 200 degrees Celsius, and a heating element having at least one heater leg, where the heater leg contacts the insulator and is configured to supply thermal energy. The heating element also has lead wires configured to provide a parallel electrical connection between the heater leg and a current source.

23 Claims, 22 Drawing Sheets

THERMAL MANAGEMENT DEVICE

BACKGROUND

1. Technical Field

The subject matter disclosed herein relates to thermal management devices, and more particularly, to thermal management devices for use with rechargeable batteries.

2. Discussion of Art

Rechargeable batteries may have challenges in thermal management and thermal regulation, particularly as the life span of the rechargeable energy storage cells increases. Premature failure of a thermal management device renders a rechargeable battery inoperative, increasing maintenance and repair costs and reducing the effectiveness of the battery system. These challenges with existing thermal management devices affect the efficiency of the battery operations and also the efficiency and operating costs of the system or systems supported by the battery.

It may be desirable to have a thermal management device that differs from those that are currently available.

BRIEF DESCRIPTION

Presently disclosed is a thermal management device. In one embodiment, the thermal management device has an insulator with a maximum use temperature greater than about 200 degrees Celsius, and a heating element with at least one heater leg. The heater leg contacts the insulator and is configured to supply thermal energy, such as to a rechargeable energy storage cell. The heating element has lead wires configured to provide a parallel electrical connection between the at least one heater leg and a current source for the thermal management device.

In another embodiment, a thermal management device includes a plurality of insulator panels with a maximum use temperature of at least 500 degrees Celsius, and a heating element comprising at least two heater legs electrically connected in parallel, where each heater leg contacts at least one of the insulator panels and is configured to supply thermal energy, such as to a rechargeable energy storage cell. The heating element has lead wires configured to provide a parallel electrical connection between the heater legs and a current source.

In another embodiment, a thermal management device includes an insulator with a maximum use temperature greater than about 500 degrees Celsius, and a heating element with at least two heater legs electrically connected in parallel. The heater legs contact the insulator and are configured to supply thermal energy to a plurality of energy storage cells. In one embodiment, each of the parallel heater legs is configured to provide substantially uniform heat flux over at least one surface of the device.

Also disclosed is an energy storage device. In one embodiment, the energy storage device includes a plurality of energy storage cells having an operating temperature of at least 250 degrees Celsius, and a thermal management device. The thermal management device has an insulator with a maximum use temperature of at least 500 degrees Celsius, and a heating element contacting the insulator and having a plurality of heater legs electrically connected in parallel. The heating element is configured to supply thermal energy to the plurality of energy storage cells. In one embodiment, the heating element includes lead wires configured to provide a parallel electrical connection between the heater legs and a current source.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

The subject matter disclosed herein relates to a thermal management device, and an energy storage device, such as a rechargeable battery system that includes a thermal management device. Referring generally to FIGS. 1 through 28, embodiments of a thermal management device and an energy storage device having a thermal management device are disclosed.

In various embodiments, a thermal management device includes an insulator, a heating element, and lead wires configured to provide a parallel electrical connection between the heating element and a current source. The heating element may have one or more heater legs electrically connected in parallel, where the heater legs contact the insulator and are configured to supply thermal energy to a structure to be heated by the thermal management device, such as an energy storage cell (electrochemical cell) of a rechargeable battery. The insulator may be a sheet silicate or other insulating material capable of supporting the heating element at the operating temperature of the thermal management device. The lead wires are configured to provide a parallel electrical connection between the heating element and a current source. When the thermal management device is utilized in an energy storage device, such as a rechargeable battery system, the current source may be the same current source used to charge the rechargeable battery, or it may be a separate current source.

Figure 1:
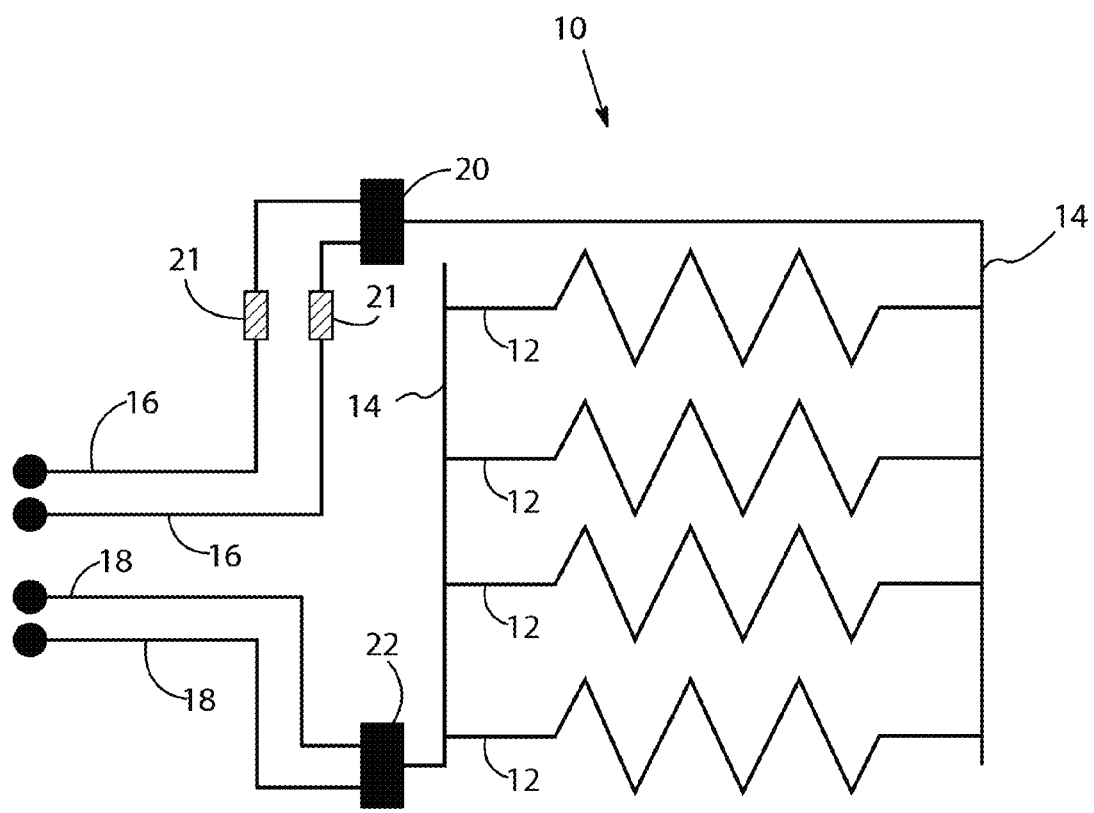
FIG. 1 is a schematic view of a thermal management device.

Referring to FIG. 1, an electrical configuration of one embodiment of a thermal management device is illustrated in schematic form. As shown, the thermal management device 10 has a heating element with four heater legs 12 electrically connected in parallel. In one embodiment, the heater legs 12 are connected to bus bars 14, but in other embodiments; the heater legs 12 may be connected directly to each other to form the electrically parallel connection. In some embodiments, the plurality of heater legs improves the fault tolerance of the thermal management device, which may continue to operate even if one or more of the heater legs becomes inoperative. As shown, the thermal management device 10 also includes a pair of positive lead wires 16 providing an electrical connection to the heating element. The positive lead wires 16 are connected to a first strain relief 20. The thermal management device 10 also includes a pair of negative lead wires 18 connected to a second strain relief 22. In one embodiment, the thermal management device includes thermal fuses 21 on at least one pair of lead wires. The thermal fuses 21 may create an open circuit, such as by melting above a desired temperature. In one embodiment, the thermal fuses 21 comprise a zinc metal fuse with a melting temperature of approximately 425 degrees Celsius. The thermal fuses 21 may be used to protect the thermal management device and related applications against thermal runaway. In other embodiments, the thermal management device 10 may include a thermistor to measure temperature, and the measured temperature may be used to regulate or discontinue operation of the thermal management device when the measured temperature exceeds a desired limit. In yet another embodiment, the thermal management device may include a positive temperature coefficient ("PTC") thermistor to limit current flow above a determined temperature. Other fuses, circuit breakers, or current limiting devices also may be provided to protect the thermal management device and related application from overheating.

Figure 2:
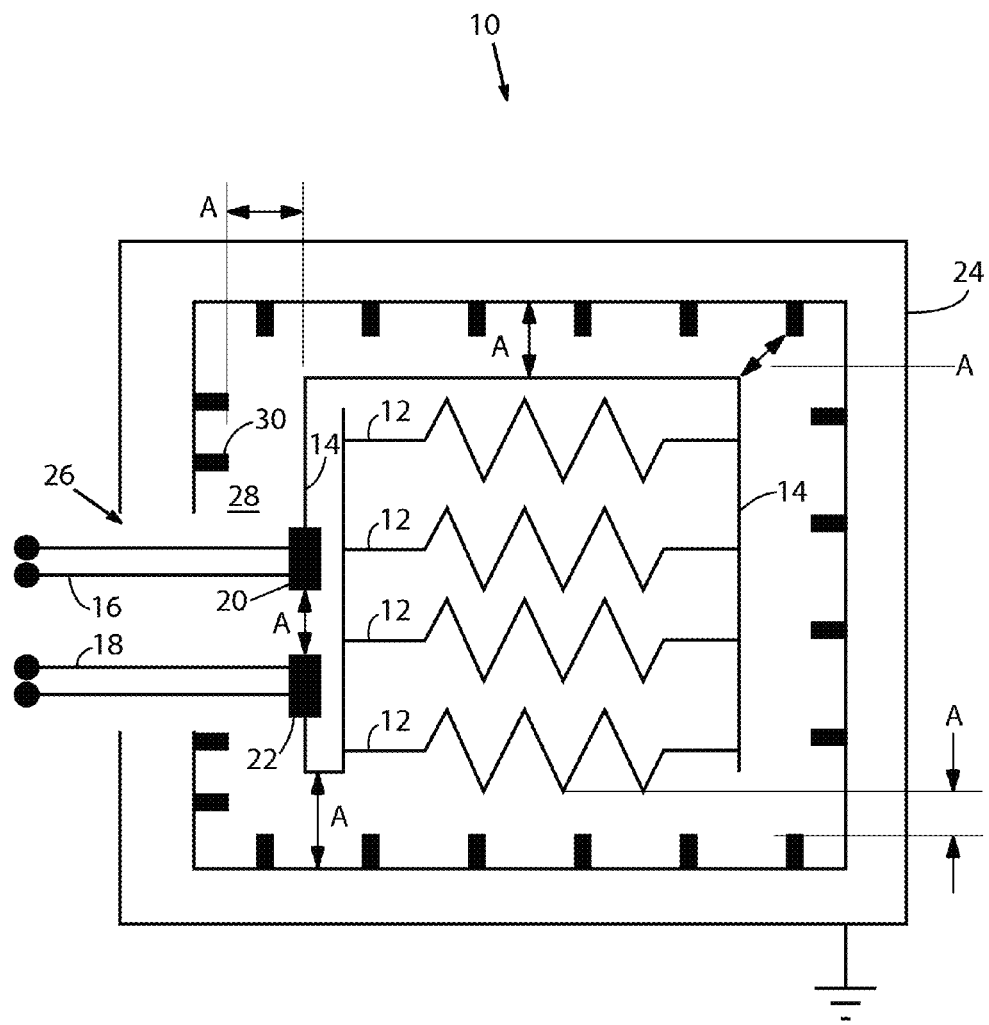
FIG. 2 is a schematic view of a thermal management device in a battery enclosure.

Referring to FIG. 2, the thermal management device 10 as illustrated in FIG. 1 is shown situated within a battery enclosure 24. In one embodiment, the battery enclosure 24 is a double walled enclosure surrounding the thermal management device and a plurality of energy storage cells (not shown). In various configurations, the thermal management device 10 is positioned above or below the energy storage cells to be heated. In other embodiments, the thermal management device has multiple sections and may be interspersed with the energy storage cells to be heated. In many applications the battery enclosure 24 is electrically grounded and separated from the conductive elements of the thermal management device 10. As illustrated, the battery enclosure 24 includes an aperture 26 through which the positive lead wires 16 and negative lead wires 18 of the thermal management device 10 extend. In one embodiment, the aperture 26 of the battery enclosure 24 also provides an opening for the electrical connection to and from the energy storage cells. In other embodiments, an aperture is provided for the lead wires and a separate aperture is provided for the power and control connections to the energy storage cells. In yet another embodiment, the lead wires terminate in an electrical connector affixed to the battery enclosure 24 that provides a plug or receptacle for connecting to an external current source to power the thermal management device.

In an embodiment, retention straps 30 secure the thermal management device 10 within the battery enclosure 24. The retention straps 30 contact the grounded battery enclosure 24 and are separated from the conductive elements including the plurality of heater legs 12. The separation between the grounded elements, such as the battery enclosure 24 and retention straps 30, and the energized elements, such as the heater legs, may be specified by applicable electrical safety codes and regulations for the voltages and currents employed in the system. In various embodiments, a minimum clearance "A" is provided between the energized elements and any grounded material of at least 6 millimeters, at least 8 millimeters, or at least 10 millimeters depending upon the operating voltages of the thermal management device.

Figure 3:
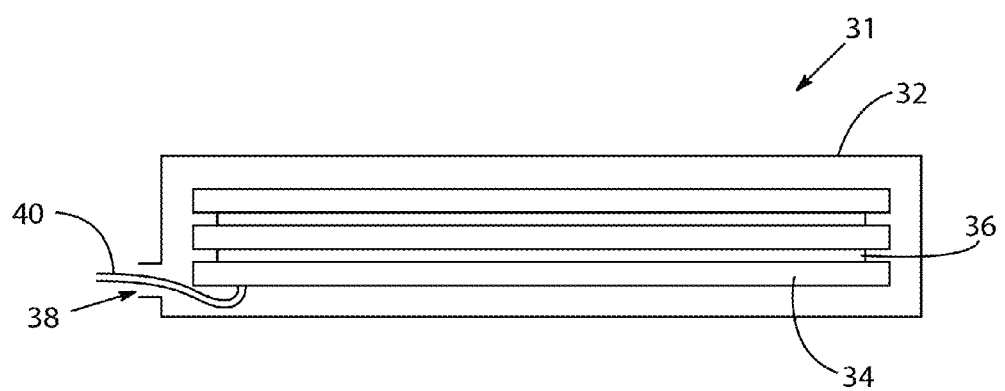
FIG. 3 is a cross-section view of a thermal management device having a housing.

Referring now to FIG. 3, in another embodiment, the thermal management device 31 includes a housing 32 surrounding heating elements 36 and an insulator comprising a plurality of insulator panels 34. As illustrated, the housing 32 includes an aperture 38 through which the lead wires 40 are routed. In one embodiment, the housing 32 is formed of a material that is electrically non-conductive at least at temperatures at and above 200 degrees Celsius. In another embodiment, the housing 32 is formed of an electrically conductive material and a non-conductive coating is applied such that the housing is electrically non-conductive at temperatures at and above 200 degrees Celsius. In one embodiment, the operating temperature inside an energy storage device is approximately 300 degrees Celsius and the outer surfaces of housing 32 are electrically insulating at and above 300 degrees Celsius. The overall dimensions of the thermal management device may be optimized for specific applications. In various embodiments, the thickness of a thermal management device including housing 32 is no more than 15 millimeters, no more than 10 millimeters, or no more than 6 millimeters. In one embodiment, the thermal management device is minimally bound by a rectangular parallelpiped boundary defined by three perpendicular axes, wherein a shortest of the axes is no more than 10 millimeters long. In another embodiment, the housing 32 provides structural support for the thermal management device allowing the device to be handled and carried for installation. In yet another embodiment, the housing 32 is provided with installation features, such as guide pins or mounting holes, to facilitate installation of a thermal management device in the desired application.

Figure 4:
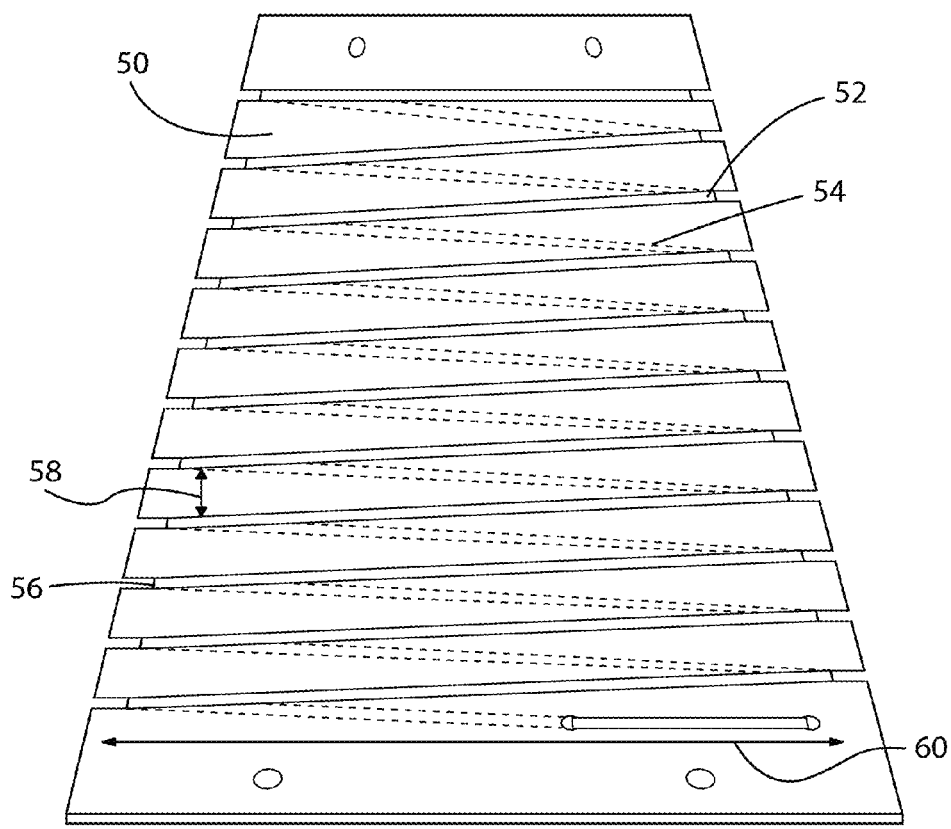
FIG. 4 is a perspective view of a first heating element.

Referring now to FIG. 4, a partial view of a thermal management device is shown illustrating a heating element having a single heater leg configured in a spiral wound pattern around an insulator.

In one embodiment, the insulator is a planar material with a maximum use temperature of at least 200 degrees Celsius. In other embodiments, employing higher temperature heating elements, the insulator may have a maximum use temperature of at least 350 degrees Celsius or of at least 500 degrees Celsius. In one embodiment, the insulator is formed of a sheet silicate insulator. One sheet silicate suitable for use as the insulator is mica, such as muscovite mica or phlogopite mica. In some applications, the insulator comprises phlogopite mica with a maximum use temperature of at least 800 degrees Celsius. In some embodiments, the insulator is provided as one or more insulator panels, where each insulator panel is a mica sheet having a thickness of at least 0.40 millimeters. In other embodiments, the insulator may be formed of silicon nitride. In yet other embodiments, the insulator may be a substrate of a thick film heater. The thickness of the planar insulator material may be selected to provide additional spacing between heating elements or to provide added rigidity to the thermal management device.

One or more insulator panels may be utilized in the thermal management device. In one embodiment, a plurality of mica sheets are secured in a stack by metal ribbon. In some embodiments, multiple insulator panels are used to increase the thickness of insulation material to provide greater electrical or thermal insulation. In other embodiments, multiple insulator panels are used to separate adjacent layers of heating elements in the thermal management device. In another embodiment, a plurality of insulator panels are secured by rivets, by wire, or by non-conductive materials suitable for use at the operating temperature of the thermal management device.

As shown in the embodiment of FIG. 4, an insulator 50 is provided that supports a heater leg 52. The heater leg 52 may be an implementation of the heater legs 12 described previously in the present description. The insulator 50 includes notches 56 staggered on opposite edges of the insulator. The heater leg 52 is wound in a spiral configuration around the insulator 50 retained by the notches 56. The portion of the heater leg extending on the underside of insulator 50 is illustrated by dashed lines 54. In one embodiment, the notches 56 are between 5 and 10 millimeters deep. The notches may be sized and spaced such that the heater leg 52 is supported in the notches, while the edge portions of the insulator 50 between the notches 56 retain sufficient strength to avoid breaking. In one embodiment, the heater leg 52 is formed of a conductor that has a rectangular cross-section. A rectangular cross section conductor may achieve a lower profile and more evenly distribute forces applied to the insulator 50 by the heater leg 52. In alternative embodiments, a conductor or wire having a circular cross-section is used.

The heater leg 52 provides resistive heating when current is passed through a conductor. The heat produced corresponds to the resistance of the conductor, which is determined by the length of the heater leg 52, as well as, the current and voltage applied to the conductor. The spiral pattern winding of the heater leg 52 around the insulator 50 distributes the heat flux from the heater leg throughout the area containing the winding. As noted below, the heater leg 52 may be configured in a variety of patterns on one or more planes to achieve the desired distribution of heat generation for the thermal management device.

In one embodiment, the spacing between successive windings of the heater leg 52 is selected based upon the operating voltage of the thermal management device. In one embodiment, the thermal management device has an operating voltage of 56 volts. In another embodiment, the thermal management device has an operating voltage of 575 volts. In one embodiment, the spacing 58 between successive windings is at least 5% of the width 60 of the insulator 50. In another embodiment, the spacing 58 between successive windings is at least 20 millimeters and the width 60 of the insulator 50 is approximately 200 millimeters.

To maintain a given electrical resistance for the heating element while connecting multiple heater legs in parallel, the resistance of each heater leg is increased as compared to a single leg heater design. The resistance of a heater leg is increased by reducing the conductor cross section or by increasing the conductor length. In one embodiment, an increased conductor length is achieved by providing additional windings around a larger insulator. In other embodiments, the footprint of the thermal management device limits the dimensions of the insulator. Therefore to increase the conductor length, multiple insulators are stacked, with the heater legs wound around insulators at different levels in the stacked configuration. In this manner, the heating element of the thermal management device is selected to provide a specified thermal output, and the heater legs are configured on one or more layers to provide the resistance necessary to achieve the specified thermal output at the operating voltage and current of the thermal management device.

Figure 5:
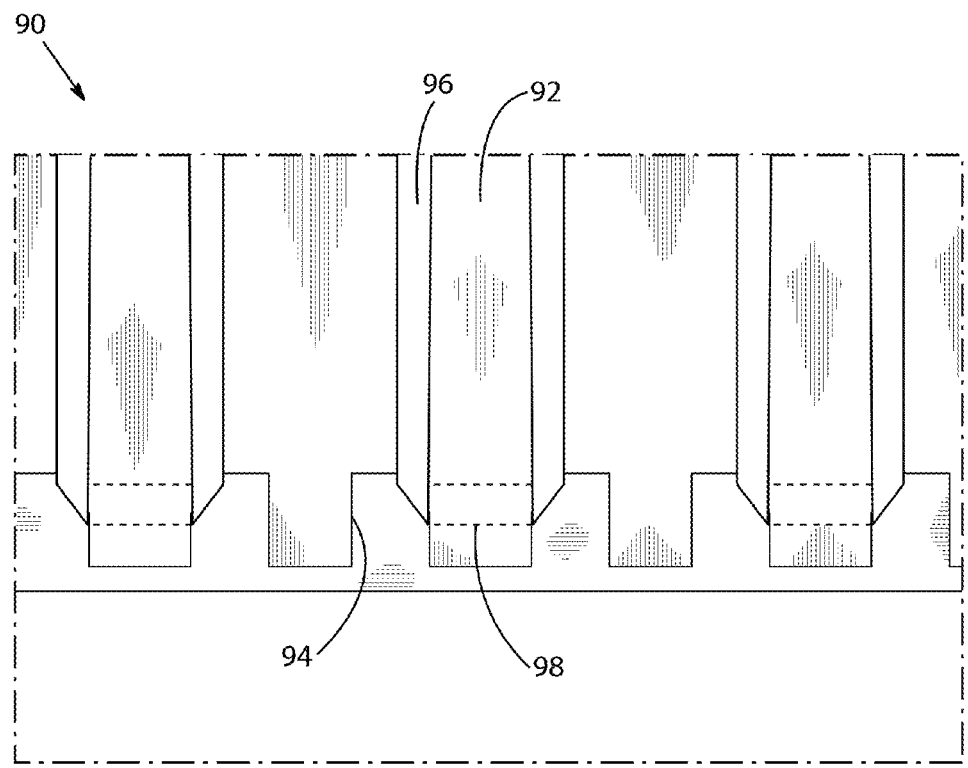
FIG. 5 is a top view of a second heating element.

While a spiral pattern winding configuration of the heater leg has been described above, the heater leg may be provided in other configurations. Referring now to FIG. 5, a heating element 90 includes a heater leg 96 secured to a mica insulator 92 in a hook-and-ladder configuration. As shown, the heater leg 96 is secured to the edge of the insulator 92 by notches 94. The heater leg 96 passes through notches 94 and is retained underneath the insulator 92 as illustrated by dashed lines 98. In one embodiment, both a spiral pattern winding and a hook-and-ladder configuration are used to secure a heater conductor to an insulator, such as by using a spiral pattern winding for at least a portion of the insulator while using a hook-and-ladder attachment adjacent at least one end of the insulator.

Figure 6:
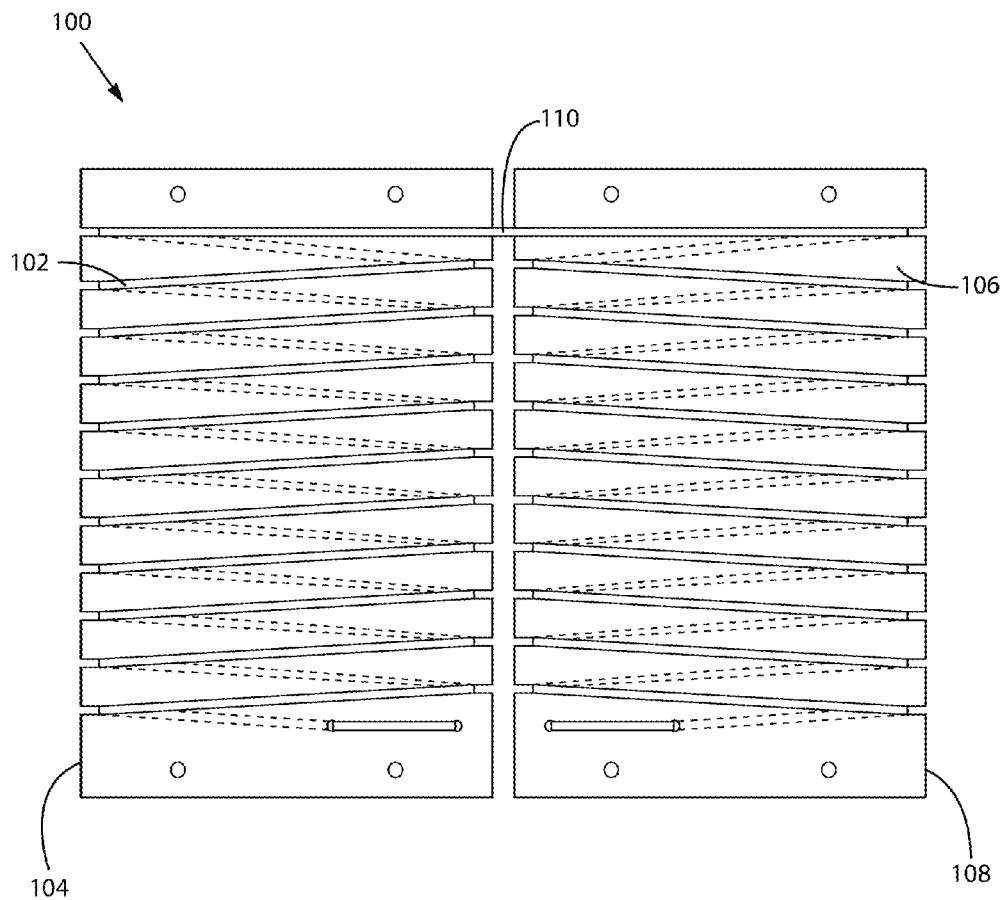
FIG. 6 is a top view of third heating element.

Referring now to FIG. 6, yet another embodiment of a heating element is illustrated supported by an insulator comprising two insulator panels. In one embodiment, the heating element 100 includes a first portion 102 of a heater leg supported on first insulator panel 104. The heating element 100 also includes a second portion 106 of a heater leg supported on a second insulator panel 108. A connecting portion 110 of the heater leg connects the first portion 102 and the second portion 106 of the heater leg and spans between the first insulator panel 104 and the second insulator panel 108. In one embodiment, the first and second insulator panels are supported on a third insulator panel, such that the first and second insulator panels lie in substantially the same plane. In another embodiment, the first insulator panel and second insulator panel are stacked vertically with a separation insulator panel in between and with the connecting portion 110 of the heater conductor extending around an edge of the separation insulator panel. In another embodiment, the heater leg spans more than two insulator panels, each connected by a connecting portion of the heater leg. In one embodiment, the spacing between successive windings is between (and including) 10 millimeters and 50 millimeters. In another embodiment, the spacing between successive windings is between (and including) 25 millimeters and 45 millimeters. In this manner, a heating element of the thermal management device is configurable into a variety of desired shapes and topologies to accommodate different operating environments and configurations.

In yet other embodiments, the heating element of the thermal management device includes two or more heater legs electrically connected in parallel to supply thermal energy. Having a plurality of heater legs connected in electrical parallel may increase the operational life of thermal management device. In some applications, after an initial start up period, a thermal management device is utilized at less than 50%, or even less than 25% of its total heat output capability. As such, a heating element with two or more heater legs may be capable of providing the necessary heat output even if one or more of the heater legs is damaged or becomes otherwise inoperative. For example, a heating element with four heater legs may be capable of producing 25% of its total heat output with only one of the four heater legs operational. In some embodiments, the expected operating life of a thermal management device is at least 10 years, and in other embodiments, the expected operating life is 20 years or greater. Over this operating lifespan, one or more heater legs may become inoperative, but the thermal management device may remain operational by maintaining sufficient heat output capability from the remaining functional heater leg or legs.

Figure 7:
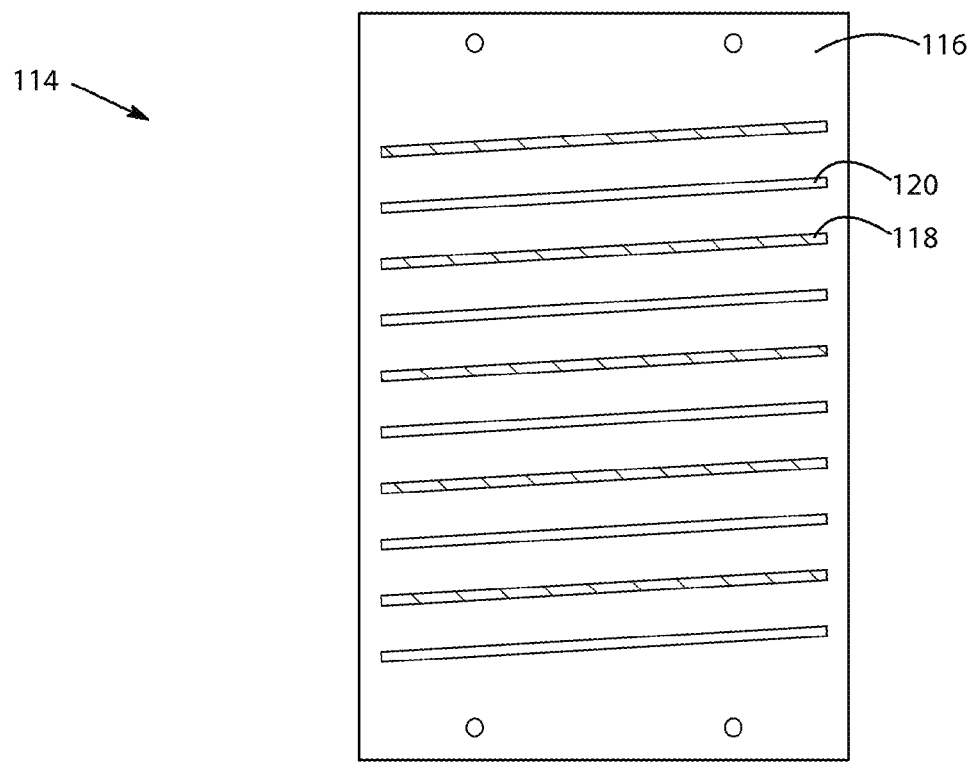
FIG. 7 is a top view of fourth heating element.

Referring now to FIG. 7, an embodiment of a heating element 114 of a thermal management device is illustrated with two electrically parallel heater legs wound in an interleaved spiral pattern around an insulator 116. As shown, the heating element 114 includes a first heater leg 118 and a second heater leg 120. The first heater leg 118 and the second heater leg 120 are electrically connected in parallel, each providing one half of the device's heat output. Due to the parallel connection, if either heater leg fails, the other heater leg may remain operational, providing up to one half of the device's maximum heat output capability. The first heater leg 118 and second heater leg 120 are each wound in a spiral pattern around the insulator 116. As previously discussed, in other embodiments, the heater legs are wound around more than one insulator. In another embodiment, the first heater leg 118 is wound around a first insulator, while the second heater leg 120 is wound around a second insulator and each heater leg is connected to a common bus bar that provides the parallel electrical connection between the heater legs.

Figure 8:
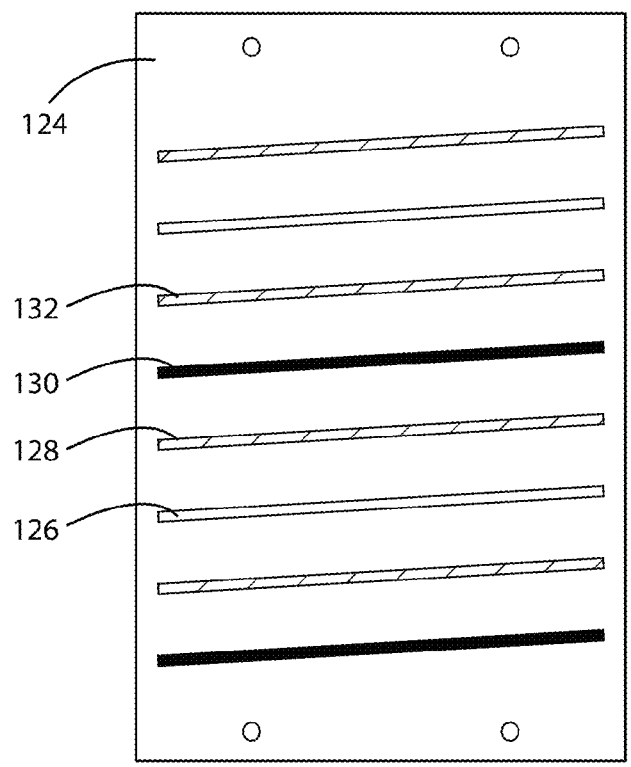
FIG. 8 is a top view of fifth heating element.

Referring now to FIG. 8, another embodiment of a heating element is illustrated having four parallel heater legs. As shown, heating element 122 includes an insulator 124 and four parallel heater legs 126, 128, 130, 132 each wound in a spiral pattern around the insulator 124. In this embodiment, each heater leg provides approximately one fourth of the total heat output when all legs are functional. When up to three legs are inoperative, the heating element may still provide up to one fourth of the maximum heat output of the device, which, in some embodiments, is sufficient for the thermal management device to remain operational, thereby extending the useful life and reducing maintenance and repair costs.

Figure 9:
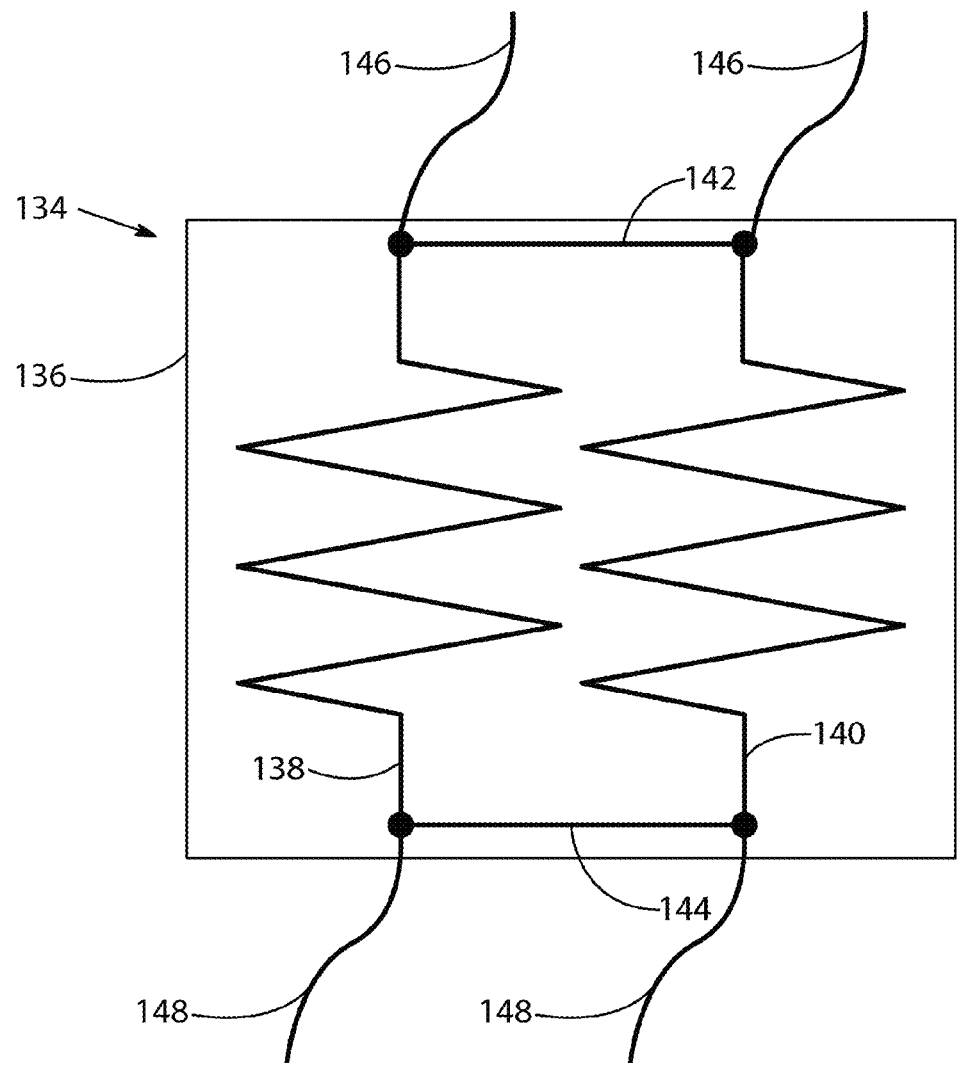
FIG. 9 is a top view of sixth heating element.

Referring now to FIG. 9, yet another embodiment of a heating element 134 is shown having two electrically parallel legs. The heating element 134 includes an insulator 136 supporting a first heater leg 138 and a second heater leg 140. In one embodiment, the first heater leg 138 and the second heater leg 140 are supported on one side of the insulator 136 without being secured to the edges of the insulator 136. In another embodiment, the first heater leg 138 and the second heater leg 140 are woven through a series of holes (not shown) in the insulator 136 to secure the heater legs in place. In yet another embodiment, the first and second heater legs are placed on the insulator 136 and a second insulator (not shown) is placed on top of the heater legs and attached to the insulator 136 to retain the heater legs in the desired location. In multiple embodiments, the first heater leg 138 and the second heater leg 140 are connected in parallel by a first connection 142 and a second connection 144, which may be bus bars or other electrical connections joining the heater legs in an electrically parallel configuration. A pair of positive lead wires 146 connect to the first connection 142, while a pair of negative lead wires 148 connect to the second connection 144. In this manner, the thermal management device may remain operational even if one of each pair of lead wires were to be damaged or disconnected.

Figure 10:
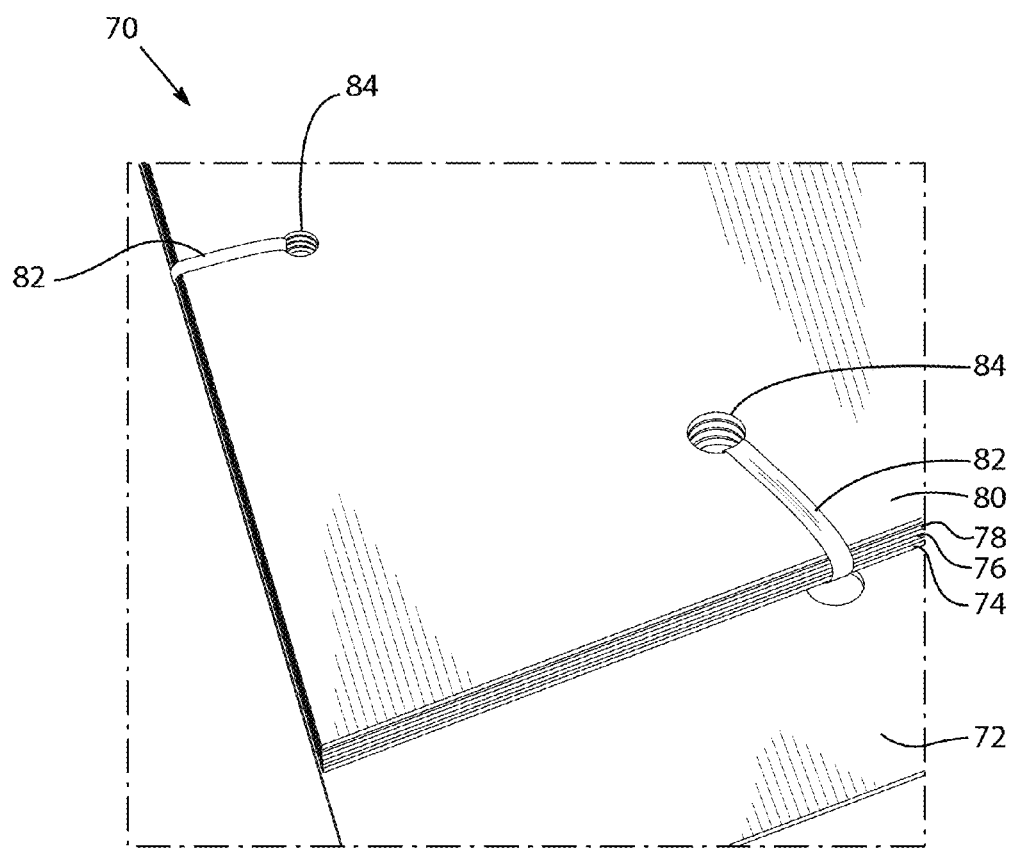
FIG. 10 is a perspective view of a portion of a thermal management device.

In one embodiment, a thermal management device includes a single heating element having a single leg disposed on a single layer. In other embodiments, a thermal management device includes a single heater element having two or more legs on a single layer. In yet other embodiments, a plurality of heating elements including a plurality of heater legs are disposed on one two or more layers within a thermal management device. Referring now to FIG. 10, a portion of a thermal management device having multiple layers is illustrated. As shown, the thermal management device includes a plurality of insulators, including five insulator panels 72, 74, 76, 78, 80 in a stacked configuration. The insulator panels are secured by metal ribbon 82 extending through holes 84 provided in each of the insulator panels. In one embodiment, the first insulator panel 74 and the second insulator panel 78 support spiral wound heater legs of the heating element of the thermal management device 70. The third insulator panel 76 provides electrical insulation between the heater legs supported by the first insulator panel 74 and the second insulator panel 78, while the fourth insulator panel 72 and the fifth insulator panel 80 provide electrical insulation for the top and bottom surfaces of the thermal management device and protect the heater legs within. In one embodiment, the metal ribbon 82 forms a retention device with a maximum use temperature of at least 500 degrees Celsius that secures insulator panels of the thermal management device to each other. Alternatively or in addition to the metal ribbon 82, other retention devices, such as metal or non-conductive wire, may be used to secure a plurality of insulator panels to each other. In yet another embodiment, rivets may be used to secure the plurality of insulator panels to each other. In one embodiment, the plurality of insulator panels are flexibly connected such that the insulator panels may move relative to each other as the panels expand and contract with changes in temperature.

Figure 11:
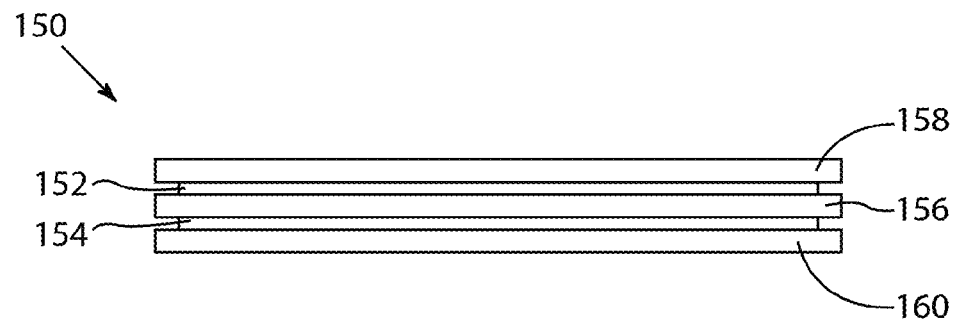
FIG. 11 is a side view of a second thermal management device.
Figure 12:
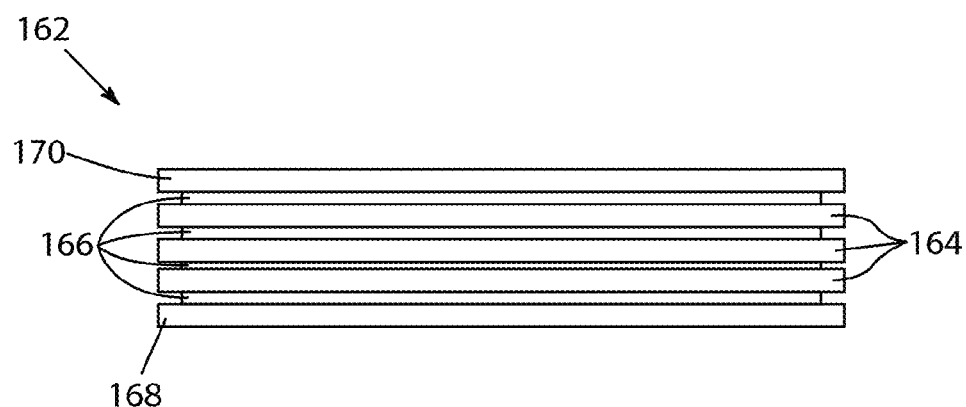
FIG. 12 is a side view of a third thermal management device.
Figure 13:
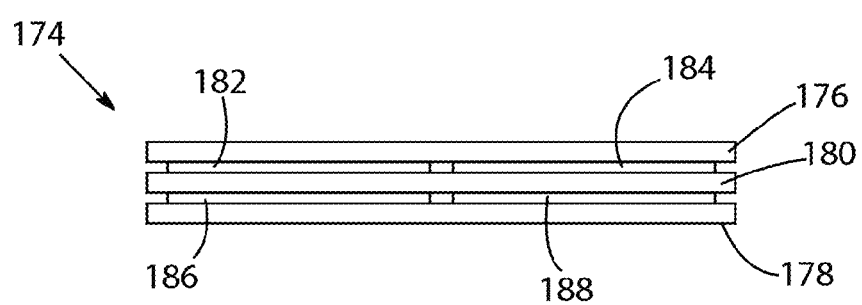
FIG. 13 is a side view of a fourth thermal management device.

Referring now to FIGS. 11 through 13, other embodiments of thermal management devices having multiple layers are illustrated in side view. As shown in FIG. 11, a thermal management device 150 includes a first heating element 152 and a second heating element 154. In one embodiment, the first heating element 152 and the second heating element 154 each include a heater leg (not shown) wound in a spiral pattern around an insulator. In other embodiments, the first heating element 152 and the second heating element 154 include two or more heater legs. The first heating element 152 and the second heating element 154 are separated by a separation insulator 156. In one embodiment, the separation insulator is a single sheet of mica. In other embodiments, two or more sheets of mica are used to separate adjacent heating elements. The thermal management device 150 also includes a top insulator 158 and a bottom insulator 160. In one embodiment, the top insulator panel 158 and the bottom insulator panel 160 each are one or more sheets of mica insulation and are secured with metal ribbon.

Referring now to FIG. 12, a thermal management device 162 includes a heating element with four heater legs 166, where each heater leg is disposed on a separate layer of the thermal management device interposed with separation insulators 164. In one embodiment, the heater legs 166 are each connected to a common bus bar that is connected to lead wires (not shown) extending out of the thermal management device. The thermal management device 162 also includes a top insulator 170 and a bottom insulator 168 which bound the thermal management device and further protect the heater legs. As shown, each heater leg spans substantially the entire cross-section of the thermal management device, such as at least 90% of the cross-sectional area, providing a substantially uniform heat flux to the outer surfaces of the thermal management device. In some embodiments, with all heater legs operational the heat flux at the bottom insulator 168 varies by no more than 25% from the average heat flux over the full surface of bottom insulator 168. In another embodiment, the heat flux varies by no more than 20% from the average heat flux across the bottom insulator 168 when all heater legs are operational.

Referring now to FIG. 13, a thermal management device 174 with a plurality of heating elements each with a plurality of heater legs is illustrated. The thermal management device 174 includes a top insulator 176, a bottom insulator 178, and a separation insulator 180. A first heating element is disposed between the separation insulator 180 and the top insulator 176, and a second heating element is disposed between the separation insulator 180 and the bottom insulator 178. Each heating element includes two heater legs electrically connected in parallel. As shown, the first heating element includes two heater legs 182, 184 each disposed on approximately one half of the cross-section of the thermal management device 174. The second heating element includes two heater legs 186, 188, each also disposed on approximately one half of the cross-section of the thermal management device. In this manner, each heating element provides heat flux over substantially the entire footprint of the thermal management device. More specifically, each heating element provides heat flux over at least 90% of either the top insulator 176 or the bottom insulator 178 of the thermal management device 174. By combining one or more heating elements, each having one or more heater legs, a thermal management device is configurable in various embodiments to provide the desired heat flux in a size and shape appropriate to the application.

In one embodiment, the heater leg of the heating element is a resistive wire formed of a suitable conductor. Thermal energy or heat is generated when a current is passed through the resistive wire. In various embodiments, the length of the resistive wire or other resistive element is selected to provide a desired total resistance corresponding to the heat generation required to be produced by the thermal management device.

In some embodiments, the heater leg includes a resistive wire having a round or rectangular cross-section. A rectangular cross-section may provide a larger footprint for the resistive wire to contact the insulator reducing stress on the wire and the insulator. In one embodiment, the heater leg is a nickel-chromium alloy resistive wire, such as nichrome, with a maximum use temperature of at least 1000 degrees Celsius. For example, the nichrome may be Ni60Cr16Fe24, Ni80Cr20, or other nickel-chromium alloys. In one embodiment, the nickel-chromium alloy is at least 75% nickel and at least 15% chromium by weight, such as 80% nickel and 20% chromium by weight. In another embodiment, the heater leg is an iron-chromium-aluminum alloy resistive wire with a maximum use temperature of at least 1000 degrees Celsius. In yet another embodiment, the heater leg is a nickel-iron alloy resistive wire with a maximum use temperature of at least 500 degrees Celsius. In yet another embodiment, the heater leg is a copper-nickel alloy resistive wire with a maximum use temperature of at least 500 degrees Celsius. In yet other embodiments, the heater leg is a resistive wire formed of an alloy containing essentially no carbon. In some embodiments, the heater leg has a high oxidation resistance. The heater leg may be a solid conductor or a braided conductor.

As previously noted, embodiments of the thermal management device include lead wires configured to provide a parallel electrical connection between a current source and the heating element. In some embodiments, the lead wires provide a parallel electrical connection between two or more electrically parallel heater legs of the heating element and the current source. The lead wires are formed of a conductive material, and may be either a solid conductor or a braided conductor. In one embodiment, the lead wires are formed of a commercial grade pure nickel, such as nickel-200. In one embodiment, nickel-200 is greater than 99.5% nickel. A lead wire formed of nickel-200 provides a high electrical conductivity and high corrosion resistance. Nickel-200 also has a maximum use temperature of at least 1400 degrees Celsius, allowing for prolonged use in high temperature applications. In another embodiment, the lead wires are formed of nickel-201, a commercially pure wrought nickel with similar properties to nickel-200. In some embodiments, nickel-201 may have a lower carbon content than nickel-200 and may resist carbon embrittlement from prolonged use at elevated temperatures. Nickel-201 also provides high electrical conductivity and high corrosion resistance. In yet other embodiments, the lead wires are formed of copper, nickel-plated copper, aluminum, stainless steel, a nickel alloy, or other conductive material.

In various embodiments, the thermal management device includes a pair of positive lead wires connecting to a first pole of a heating element and a pair of negative lead wires connecting to a second pole of a heating element, such as illustrated in FIGS. 1 and 2. In some embodiments, the thermal management device includes two or more heating elements and multiple pairs of lead wires, with each pair of lead wires connecting to one of the poles of one of the heating elements. In operation, each lead wire of a given pair supports approximately one half of the current supplied to the heating element. In other embodiments, more than two lead wires are provided for each pole of each heating element and each lead wires carries less than one half of the current supplied to the heating element. In some embodiments, during the startup phase of the thermal management device, a maximum heat output is generated and a maximum current flows through the lead wires. During subsequent operations, the thermal management device may be operated at no more than 50%, or no more than 25% of its total capacity, with a corresponding reduction in the current required. In one embodiment, each lead wire is designed to supply at least 50% of the total maximum current, and during subsequent operations, the thermal management device may remain operational even if one of the lead wires is damaged or otherwise inoperative. In this manner, the lead wires provide improved fault tolerance for the thermal management device and may extend the operational life of the thermal management device, thereby reducing costs for maintenance and repair.

The lead wires of the thermal management device extend out of the body or main part of the thermal management device to connect to a current source to power the heating elements. In one embodiment, the lead wires are provided with insulation to maintain electrical isolation between the lead wires and a housing or cover of the thermal management device. In other embodiments, the lead wire insulation also provides mechanical protection to protect the lead wires against wear or damage as the lead wires are moved during installation or operation of the thermal management device. For example, various components of the thermal management device or surrounding application may expand and contract as a result of temperature changes over the lifespan of the thermal management device, causing movement of the lead wires relative to other components in the system. Movement of lead wires has in the past resulted in abrasion of the lead wire insulation and even damage to the conductors of the lead wires. Additionally, bending of lead wires around corners and other structures has further limited the reliability of thermal management devices. To mitigate damage to the lead wire conductor, the lead wire insulator provides mechanical protection to the conductor during movement of the lead wire. In one embodiment of the present system, the lead wires are insulated with an electrically insulating material having a maximum use temperature of at least 400 degrees Celsius. In another embodiment, the lead wires are insulated with an abrasion resistant material. In one embodiment, the lead wire insulation is a polytetrafluoroethylene (PTFE) (e.g., Teflon® brand) coated fiberglass insulation. PTFE is a synthetic fluoropolymer of tetrafluoroethylene that finds numerous applications. PTFE is most well known by the DuPont brand name Teflon. In another embodiment, the lead wire insulation is a mica-PTFE-fiberglass insulation ("MTG"). In one embodiment, the MTG insulation includes a combination of fiberglass, PTFE tape, and phlogopite mica tape. In yet another embodiment, the lead wires are protected by a metal braided mesh covering. In yet other embodiments, the lead wire insulation is a polymide insulation, phenolics insulation, cement insulation, ceramic insulation, or combinations thereof. In various embodiments, the temperature within a battery enclosure is approximately 300 degrees Celsius and the current flow through the lead wires may increase the temperature of the lead wire insulation up to 400 degrees Celsius. In these embodiments, the lead wire insulation has a maximum use temperature of at least 400 degrees Celsius. In other embodiments, the current flow through the lead wire is limited such that the maximum use temperature of the lead wire insulation is not exceeded during operation of the thermal management device.

The thermal management device may also have one or more strain reliefs provided for the parallel lead wires. In prior systems, mechanical failure of lead wire connections have rendered battery heaters inoperative, and as a result, required replacement or repair of rechargeable battery systems. Providing one or more strain reliefs for the lead wires may thus improve the reliability of the thermal management device, extending the operational life and reducing maintenance and repair costs of a system employing the thermal management device.

Figure 14:
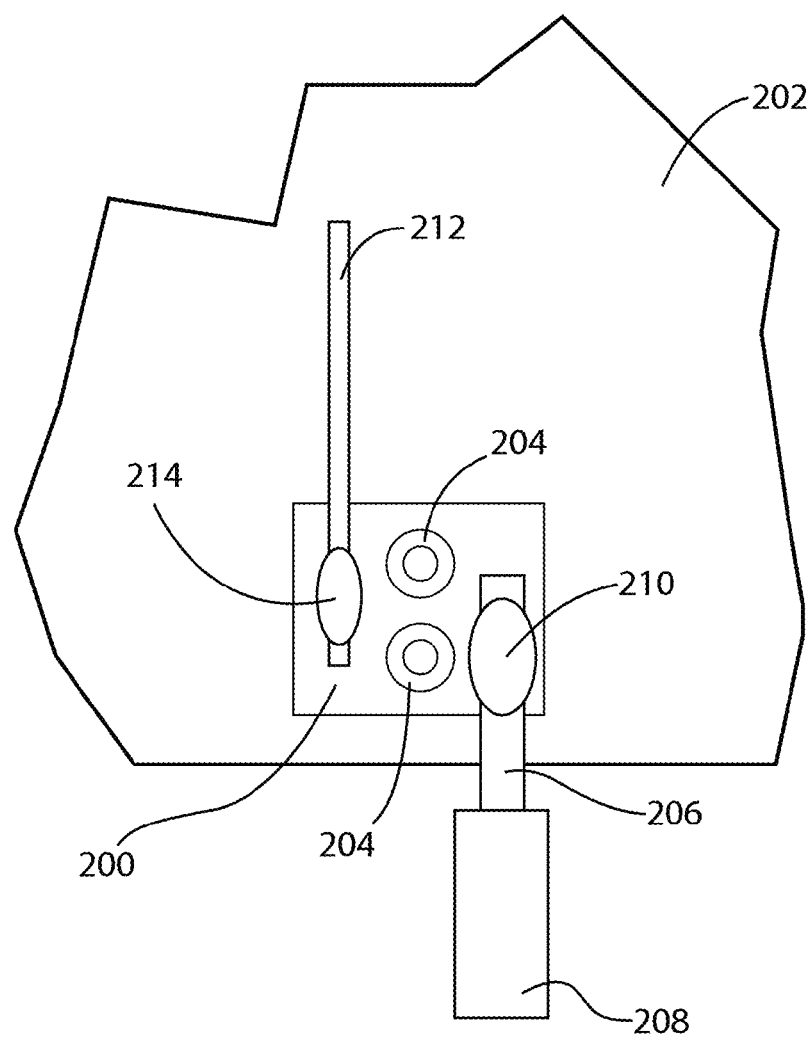
FIG. 14 is a top view of a strain relief.

Referring now to FIG. 14, a strain relief for use with the thermal management device is illustrated. A strain relief block 200 is attached to the insulator 202, such as a mica sheet. In one embodiment, the strain relief block 200 is attached to the insulator 202 by rivets 204. In other embodiments, the strain relief block 200 is attached to the insulator 202 by other mechanical or adhesive connections compatible with the operating temperature of the thermal management device. In one embodiment, the strain relief block 200 is positioned so as to reduce the length of the lead wires extending out of a housing for the thermal management device. As shown, a lead wire 206 having lead wire insulation 208 extends towards the strain relief block 200. A portion of the conductor of the lead wire 206 is exposed and mechanically secured to the strain relief block 200 at first connection 210. Similarly, a portion of the conductor of a heater leg 212 is mechanically secured to the strain relief block 200 at a second connection 214. Additionally, the lead wire 206 and the heater leg 212 are electrically connected at the strain relief block 200. In one embodiment, the strain relief block 200 provides an electrical connection between the first connection 210 and the second connection 214 to transfer current from the lead wire 206 to the heater leg 212. In some embodiments, the strain relief block 200 provides a connection for a single heater leg 212 and a single lead wire 206, such as shown in FIG. 14. In other embodiments, a strain relief block may include a plurality of first connections each configured to connect one or more lead wires, and a plurality of second connections each configured to connect one or more heater legs. In yet another embodiment, two or more strain relief blocks may be provided to support the lead wires and heater legs of the thermal management device. Connecting the lead wire 206 and the heater leg 212 to the strain relief block 200 reduces stress on the electrical connection between the lead wire and the heater leg as the lead wires are routed through a housing, or manipulated during assembly or installation of the thermal management device.

Figure 15:
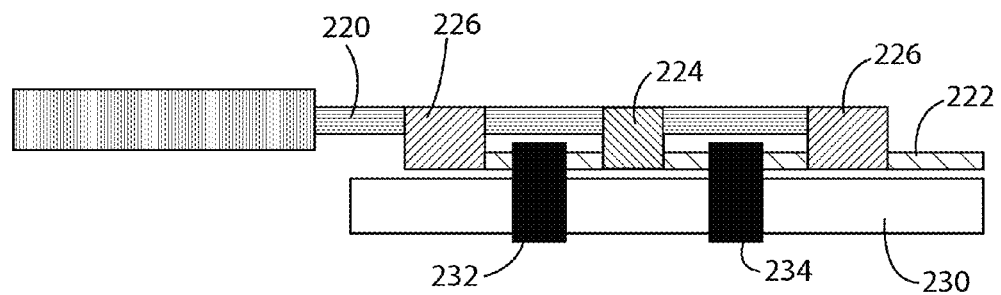
FIG. 15 is a cross-section view of a strain relief.

Referring now to FIG. 15, one embodiment of a strain relief connection is illustrated, where the lead wires are connected to the strain relief by a weld connection and by a mechanical connection. As shown, a lead wire 220 is connected to a strain relief pad 222 by a weld connection 224. In various embodiments, the weld connection includes a brazing or a solder connection when the operating temperature of the thermal management device is below the melting temperature of a connection formed using those technologies. In one embodiment, temperatures near the weld connection may reach 800 degrees Celsius and a welded joint with a melt temperature of at least 800 degrees Celsius is utilized. Alternatively or in addition, the lead wire 220 is also secured to the strain relief pad 222 by mechanical connections 226 on either side of the weld connection 224. In one embodiment, the mechanical connections 226 maintain the electrical connection between the lead wire 220 and a conductive portion of the strain relief pad 222. In another embodiment, the weld connection 224 may connect the lead wire 220 to a conductor of a heater leg and may or may not form a welded connection to the strain relief pad 222. In one embodiment, the mechanical connection includes a twist tie. In other embodiments, the mechanical connection includes folding or wrapping the lead wire around a portion of the strain relief pad 222. The mechanical connection may be selected based on the operating temperature of the thermal management device. For some applications polymer tapes are utilized. In yet another embodiment, the mechanical connection 226 includes rivets used to secure the lead wire 220 to the strain relief pad 222. As noted above, the strain relief pad 222 is secured to the insulator 230 by rivets 232, 234. In one embodiment, the rivets 232, 234 securing the strain relief pad 222 to the insulator 230 are positioned between the weld connection 224 and the mechanical connections 226 to improve the distribution of forces applied to the lead wire. In one embodiment, the thermal management device is manufactured by securing a lead wire to the strain relief by welding prior to securing the mechanical connections on either side of the welded connection to minimize stress on the lead wire during installation.

Figure 16:
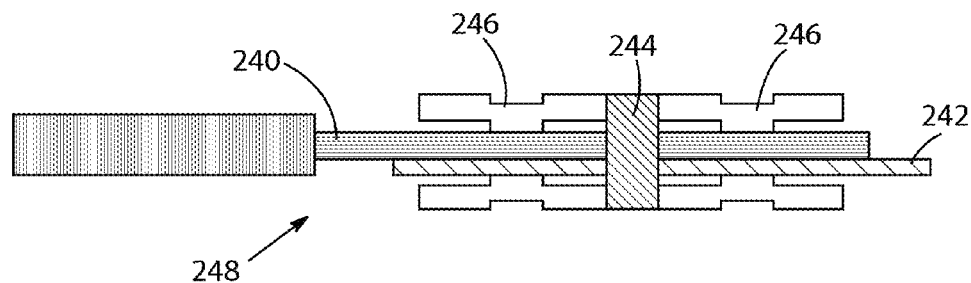
FIG. 16 is a cross-section view of another strain relief.

Referring now to FIG. 16, yet another embodiment of a strain relief for use in a thermal management device is illustrated. In one embodiment, a lead wire 240 is welded to a conductor of a heater leg 242 by a weld 244. The weld 244 establishes both an electrical and mechanical connection between the lead wire 240 and the heater leg 242 and avoids the introduction of oxides between the conductors. The strain relief also includes a crimp tube 248. In one embodiment, the lead wire 240 and heater leg 242 are positioned within the crimp tube 248, and all three components are welded together as illustrated by the weld 244. In one embodiment, crimp connections 246 are provided on either side of the weld 244 to provide mechanical support to the lead wire and heater leg. The crimp connections 246 absorb and dissipate stresses resulting from movement of the lead wire 240, further protecting the weld connection. In yet another embodiment, a combination of mechanical connections, such as twisted, tied, folded, crimped, or riveted, are used to secure the lead wire and heater leg to the strain relief.

Figure 17:
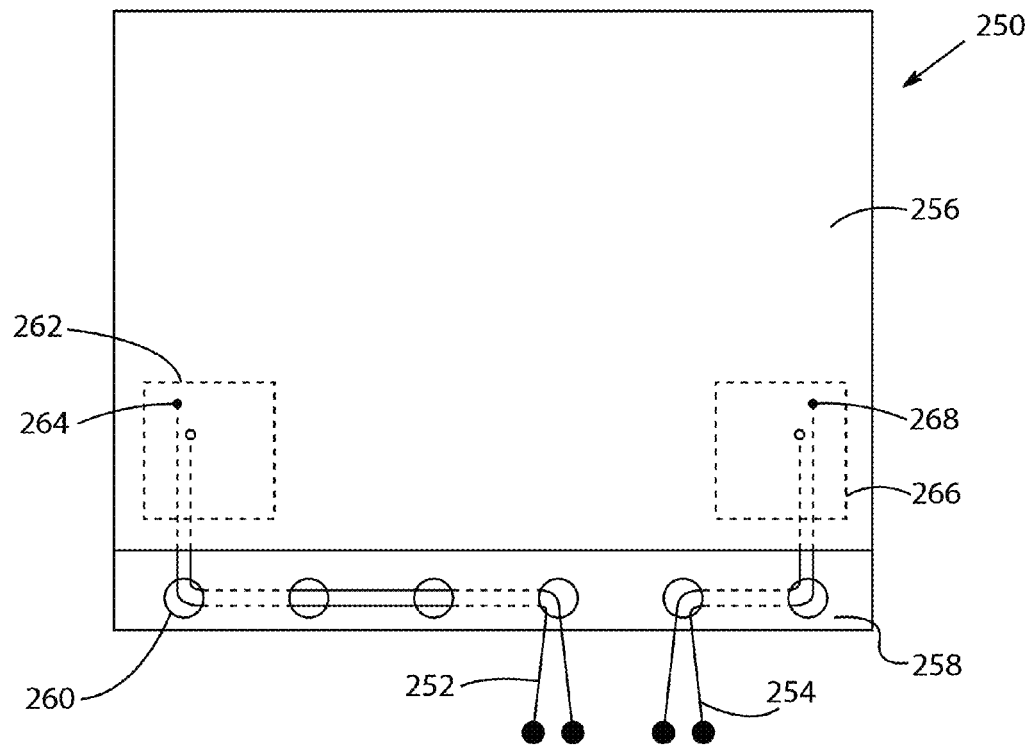
FIG. 17 is a top view of a thermal management device with a strain relief.

Referring now to FIG. 17, a top view of a thermal management device with another embodiment of a strain relief for the lead wires is illustrated. In one embodiment, the thermal management device 250 includes a first insulator 258, and a second insulator 256. One or more heating elements (not shown) are disposed between the first and second insulators as previously discussed. In one embodiment, the first insulator 258 is a center panel within a generally symmetric arrangement of insulator panels and heating elements are provided both above and below the center panel. A pair of positive lead wires 252 may extend from a first strain relief block 262 secured to the first insulator 258, where the positive lead wires are electrically connected to at least one heater leg at connection 264. A pair of negative lead wires 254 may extend from a second strain relief block 266 secured to the first insulator, where the negative lead wires are electrically connected to at least one heater leg at connection 268. In other embodiments, the strain relief blocks are not utilized and the lead wires may be connected to the heater legs by other methods. The first insulator 258 of the thermal management device 250 also includes a plurality of apertures 260 configured for routing the pair of positive lead wires 252 and the pair of negative lead wires 254. As shown, the lead wires may be laced through the apertures 260 extending on alternating sides of the insulator between adjacent apertures. In one embodiment, to maintain separation, the positive lead wires 252 are laced through apertures separate from the apertures used for negative lead wires 254. Although the apertures 260 are illustrated in a generally circular configuration, apertures of other shapes may also be used. In this manner, the first insulator 258 having apertures 260 provides a strain relief for the lead wires. If tension is applied to the lead wires, the resulting stresses may be at least partially transferred to the first insulator 258 as the lead wires pull against the edges of the apertures 260. In this manner, the electrical and mechanical connections of the lead wires are further protected against breakage or other damage.

Figure 18:
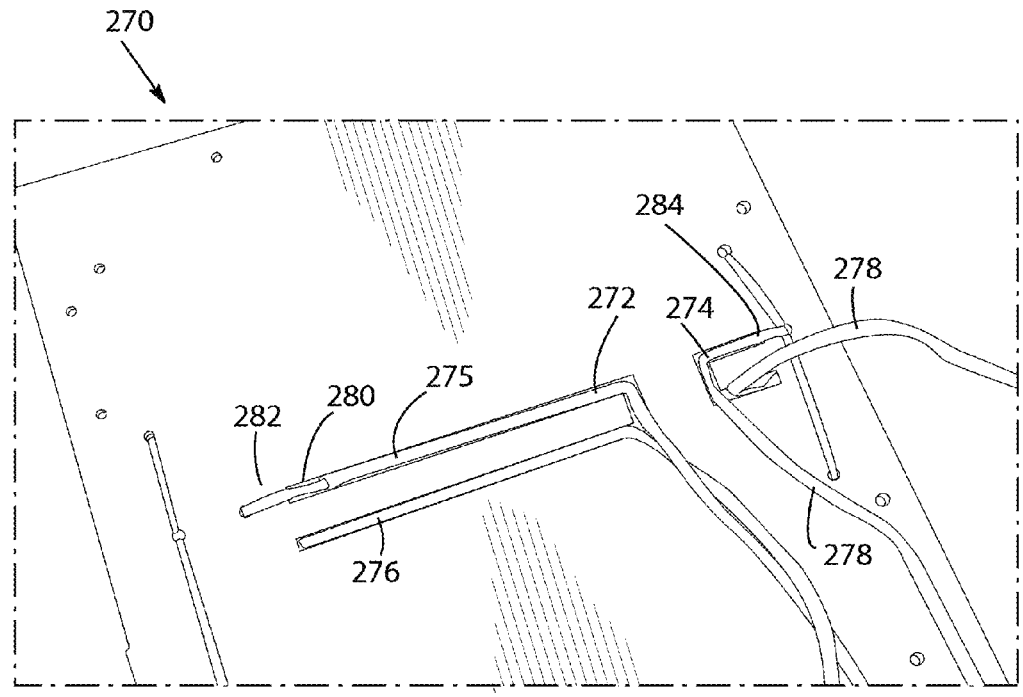
FIG. 18 is a view of a thermal management device with a strain relief with the bottom insulator removed.

Referring now to FIG. 18, an insulator 270 is illustrated with another embodiment of a strain relief for the lead wires of the thermal management device. The insulator 270 supports one or more heater legs. A portion of a heater leg 282 is illustrated connected to a lead wire 275 by weld 280. In one embodiment, the insulator 270 is provided with a first channel 272 extending through the insulator. The first channel 272 is configured to receive a first pair of lead wires 275, 276. As shown in FIG. 18, the insulator 270 also includes a second channel 274 extending through the insulator panel. The second channel 274 is configured to receive a second pair of lead wires 278. Each one of the first pair of lead wires 275, 276 is disposed within a portion of the first channel 272. As illustrated, the first channel 272 is substantially U-shaped and each one of the pair of first lead wires 275, 276 is disposed in one segment of the first channel 272. In other embodiments, the first channel 272 may include two sections that are unconnected. The width of the first channel 272 is sized to accommodate the diameter of the lead wires 275, 276. In one embodiment, the width of the first channel 272 is substantially the same dimension as the lead wire diameter, such as between 95% and 105% of the lead wire diameter. In another embodiment, the width of the first channel 272 is between 98% and 102% of the lead wire diameter. In another embodiment, the width of the first channel 272 is substantially equal to the diameter of the lead wires 275, 276 such that each lead wire is mechanically secured in the channel due to interference between the lead wire insulation and the sides of the channel. In this embodiment, the first channel 272 provides a strain relief as forces on the lead wire are at least partially transmitted to the insulator 270. In one embodiment, the lead wires 275, 276 are secured to the heater leg 282 by welds, such as the weld 280 illustrated for the lead wire 275. In a similar manner, the second pair of lead wires 278 are retained and strain-relieved by second channel 274, and connected to a heater leg by weld 284.

In one embodiment, the weld 280 is disposed within the first channel 272 such that the weld does not increase the overall thickness of the thermal management device. In some embodiments, the overall thickness of the thermal management device is equal to the thickness of an upper and lower insulation panel plus the diameter of the lead wire disposed between the upper and lower insulation panels in the first channel 272.

Figure 19:
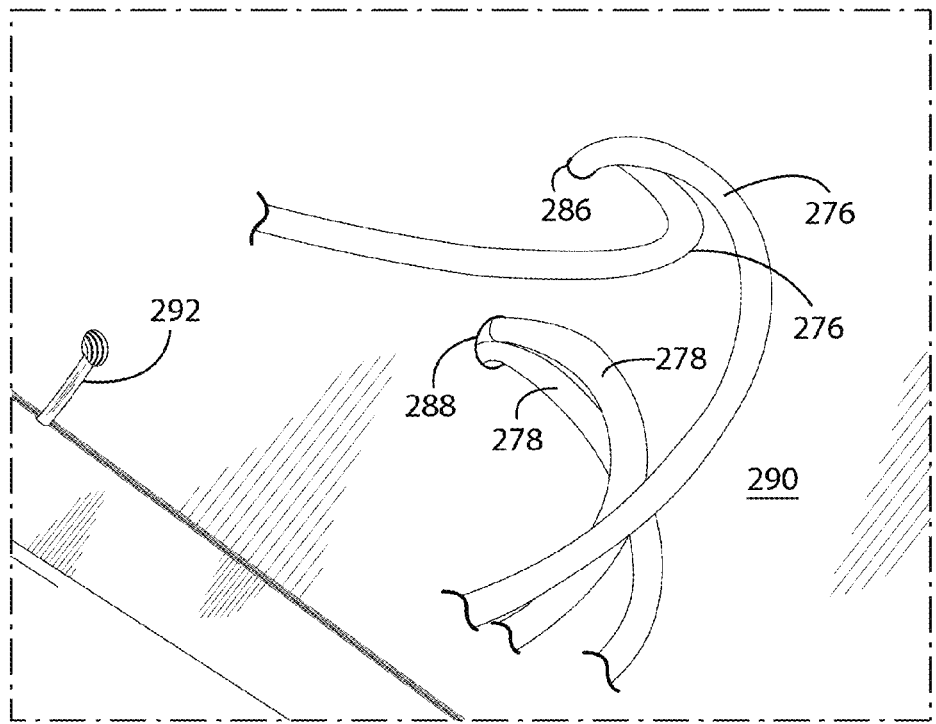
FIG. 19 is a bottom view of the thermal management device of FIG. 18 with the bottom insulator installed.

In one embodiment, illustrated in FIG. 19, the first pair of lead wires 276 extend from the first channel through a first hole 286 provided in a bottom insulator 290. Similarly, the second pair of lead wires 278 extend from the second channel through a second hole 288 provided in the bottom insulator 290. In other embodiments, the first hole 286 and the second hole 288 may be provided in a top insulator when it is desired to route the lead wires out the top side of the thermal management device. Alternatively, the first hole 286 and the second hole 288 may be provided on opposite sides of the thermal management device when it is desired to route the positive and negative lead wires on opposite sides of the thermal management device. In yet other embodiments, one hole may be provided for each of the lead wires to accommodate other configurations and applications, or a single hole may be provided for all lead wires. As illustrated, the lead wires are routed at approximately a 90° angle from the channel of an interior insulator through the hole in an exterior insulator, for providing additional strain relief. The interior and exterior insulators may be joined by metal ribbon 292 such that the lead wires are secured in the channel of the interior insulator. In yet another embodiment, the strain relief provided by the channel and hole may be used in connection with one or more of the strain relief systems previously discussed.

Figure 20:
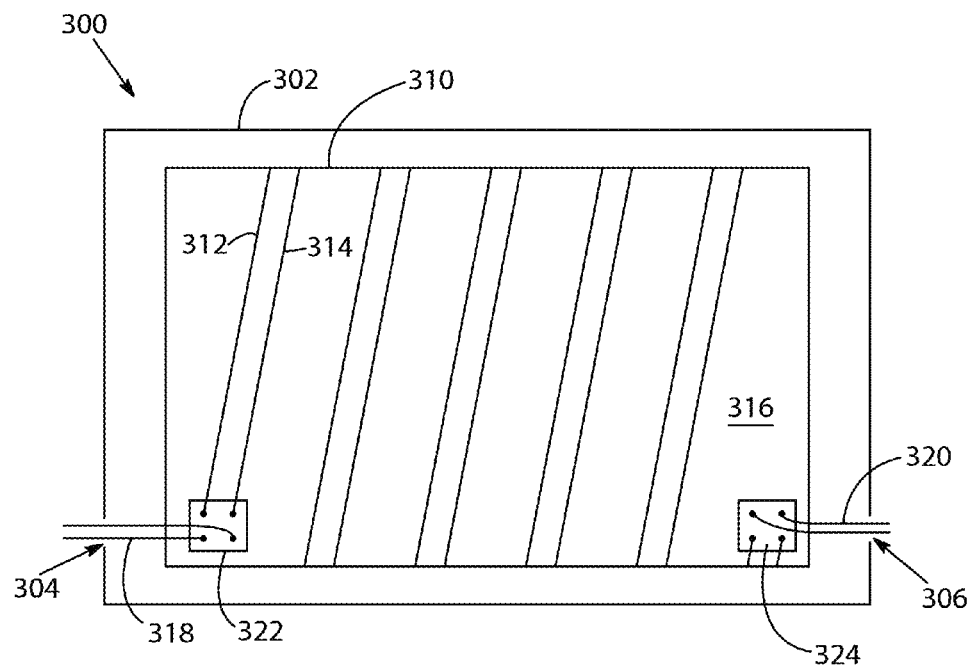
FIG. 20 is a top view of another thermal management device.

Referring now to FIG. 20, a thermal management device in which each of the electrically parallel heater legs is configured to provide substantially uniform heat flux over at least one surface of the thermal management device is shown. In the embodiment illustrated, the thermal management device 300 includes a heating element 310 disposed within a housing 302. The housing 302 has a top surface and a bottom surface (not shown). In one embodiment, the thermal management device 300 is positioned within a battery enclosure above a plurality of energy storage cells such that heat flux across the bottom surface of the housing 302 heats the energy storage cells to a desired operating temperature and maintains the energy storage cells at the desired operating temperature as needed throughout the lifespan of the battery system. As shown, the heating element 310 includes a first heater leg 312 and a second heater leg 314. The first heater leg 312 and the second heater leg 314 are electrically connected in parallel and each is connected to a first strain relief block 322 and a second strain relief block 324. The first strain relief block 322 and the second strain relief block 324 are each connected to an insulator 316 (e.g., a mica insulator panel) about which the first and second heater legs are wound in a spiral pattern. A pair of positive lead wires 318 are connected to the first strain relief block 322, and extend out of the housing 302 through an aperture 304. A pair of negative lead wires 320 are connected to the second strain relief block 324 and extend out of the housing 302 through the aperture 306. In this fashion, the thermal management device 300 is configured to generate heat for a battery system by passing current through positive lead wires; first and second heater legs, and negative lead wires. Additionally, the thermal management device 300 may remain operational in the event of a failure of one lead wire of each pair, or one of the first and second heater legs:

As shown in FIG. 20, the first heater leg 312 and the second heater leg 314 are each configured to provide substantially uniform heat flux over the top surface and/or bottom surface of the thermal management device 300. In one embodiment, a substantially uniform heat flux over a surface is defined as a local heat flux that varies by no more than 25% from the average heat flux over the footprint defined by the heater legs of the thermal management device. In another embodiment, a substantially uniform heat flux over a surface is defined as a local heat flux that varies by no more than 20% from the average heat flux over the footprint defined by the heater legs of the thermal management device. In yet another embodiment, a substantially uniform heat flux is defined as a local heat flux in any one square inch region that varies by no more than 25% from the average heat flux over the footprint defined by one leg of a heating element of the thermal management device. In yet another embodiment, each heating element is configured to provide uniform heat flux over at least 20% of one surface of the device. In yet another embodiment, each heater leg is configured to provide uniform heat flux over at last 20% of one surface of the thermal management device. A thermal management device configured to provide a substantially uniform heat flux may result in a more even heating of the energy storage cells or other structures being heated. Additionally, a thermal management device having a plurality of heater legs with each heater leg configured to provide substantially uniform heat flux over at least 90% of the surface, if a heater leg is damaged or become inoperative, the remaining operational heater leg(s) may still provide a substantially uniform heat flux to the energy storage cells or other structuring being heated.

Figure 21:
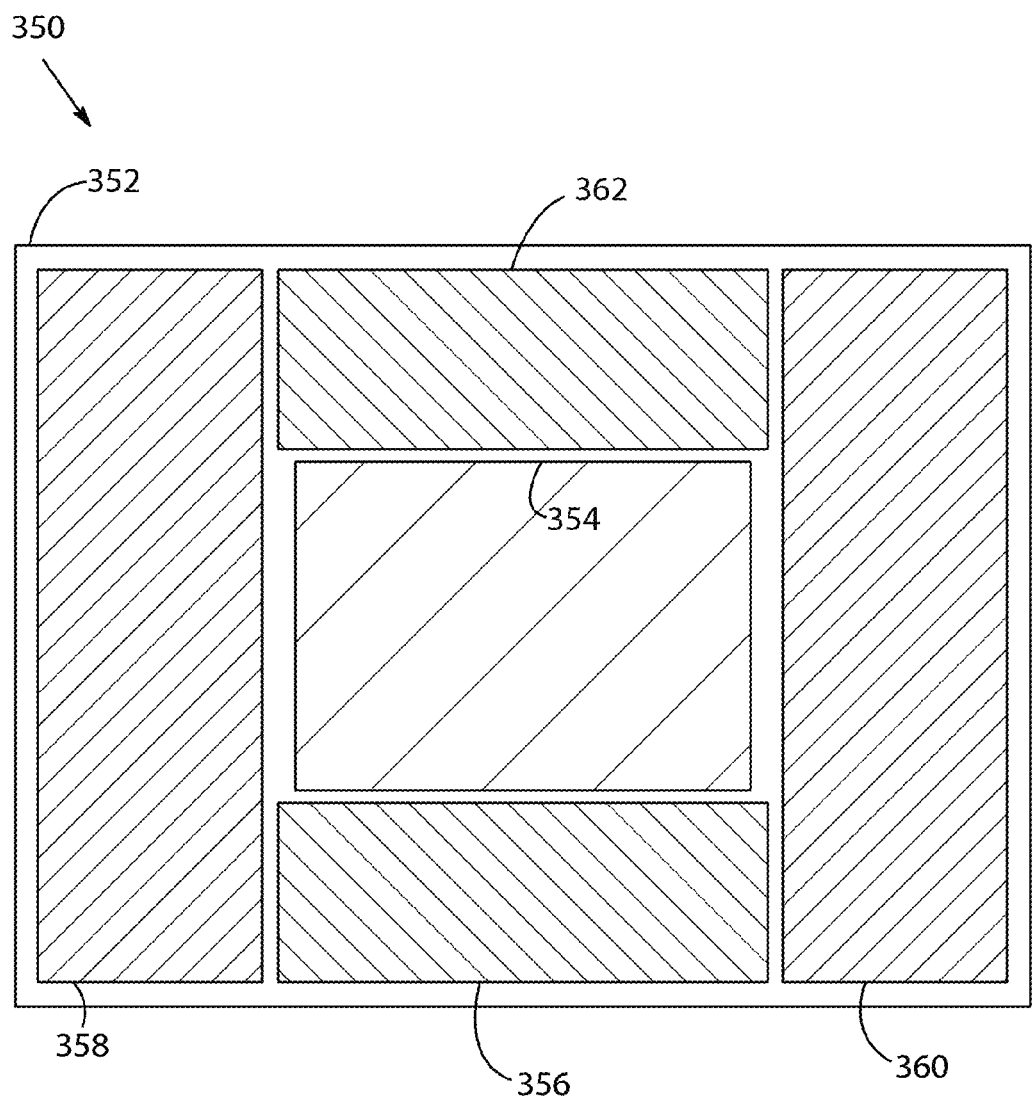
FIG. 21 is a top view of another thermal management device.

Referring now to FIG. 21, another embodiment of a thermal management device 350 is illustrated that may provide non-uniform heat flux over at least one surface of the thermal management device. As shown, the thermal management device 350 has a heating element including a plurality of heater legs each supported on an insulator within a housing 352. In one embodiment, a first heater leg 354 provides a first heating region corresponding to a portion of the area to be heated, and a second heater leg 356 provides a second heating region corresponding to a different portion of the area to be heated. In one embodiment, the first heating region corresponds to an interior portion of an energy storage device, and the second heating region corresponds to a perimeter region of an energy storage device with a greater thermal loss than the interior region of the energy storage device.

As described below, it may be desired to achieve a substantially uniform temperature in a structure employing a thermal management device, such as an energy storage device. As the structure being heated may have greater heat loss in some regions than in others, the thermal management device may be configured to provide greater heat flux in the regions where the structure has the greater heat loss. For example, an energy storage device may have greater heat loss around the perimeter of the device, resulting in energy storage cells near the perimeter having a lower temperature than energy storage cells in an interior portion of the device. In one embodiment, the thermal management device 350 is configured to at least partially compensate for the uneven heat distribution by providing increased heat flux to those regions where the energy storage device experiences greater thermal losses.

In one embodiment, the first heater leg 354 provides a first heating region, where the first heating region corresponds to (e.g., is primarily configured to impart thermal energy to) an interior portion of an energy storage device. The second heater leg 356 provides a second heating region, where the second heating region corresponds to at least a portion of a perimeter of an energy storage device having greater heat loss than the interior portion. The first and second heater legs are configured such that the second heating region has a heat flux at least 25% greater than the heat flux of the first region. In other embodiments, the heat flux of the second heating region is between (and including) 10% and 25% greater than the heat flux of the first heating region. The difference in the desired heat flux between the first and second heating regions may be selected based on thermal characteristics of the specific structure or application to be heated by the thermal management device.

As illustrated in FIG. 21, the thermal management device 350 may also include a third heater leg 358, a fourth heater leg 360, and a fifth heater leg 362 extending substantially around the perimeter of the thermal management device. In one embodiment, the plurality of heater legs define one or more additional heating regions providing a heat flux selected to achieve a substantially uniform temperature among the energy storage cells of an energy storage device.

Figure 22:
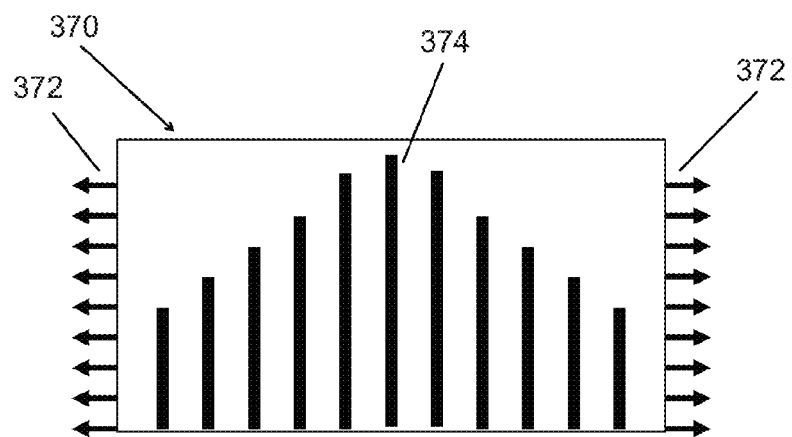
FIG. 22 is a thermal profile of an energy storage device.
Figure 23:
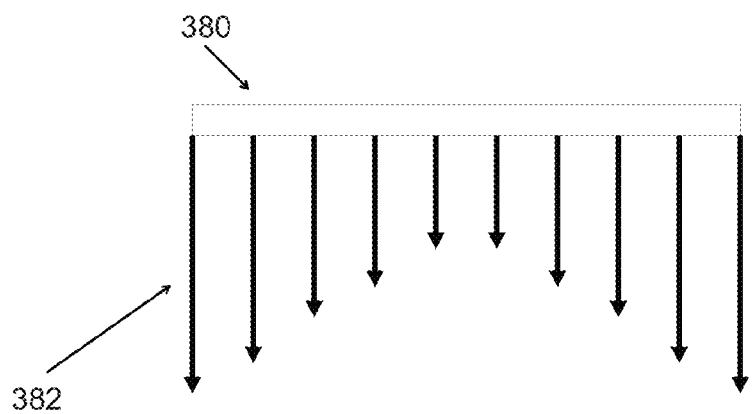
FIG. 23 is a heat flux profile of a thermal management device.
Figure 24:
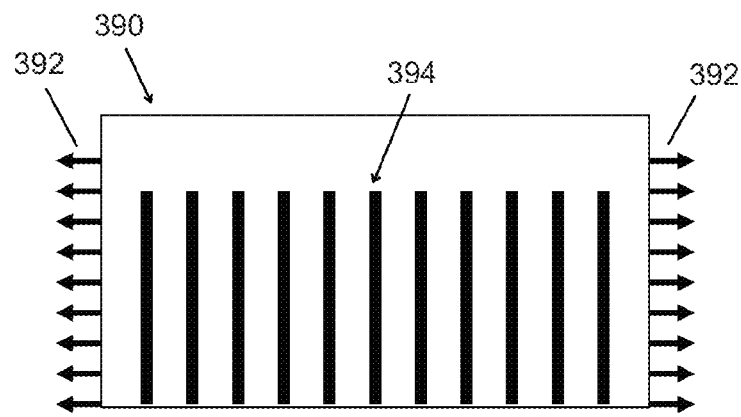
FIG. 24 is a thermal profile of an energy storage device with substantially uniform cell temperature.

Referring now to FIGS. 22 through 24, the operation of a thermal management device having a non-uniform heat flux is illustrated. In one embodiment, an energy storage device may have a temperature gradient across the energy storage cells of the device. Such a temperature gradient may result in an energy storage cell thermal profile 370 along a cross section of the energy storage device, such as illustrated in FIG. 22, where the relative temperature of the energy storage cells is indicated by the length of the bars in the thermal profile 370. As indicated by the thermal profile 370, the cells near the perimeter of the energy storage device may have a lower temperature because of heat loss 372 from the sides of an enclosure. In contrast, the cells in the interior portions 374 of the energy storage device may have a relatively higher temperature as indicated. In these and other applications, a thermal management device 380 may be provided having a non-uniform heat flux profile 382, such as illustrated in FIG. 23. The amount of heat flux from the thermal management device is illustrated by the length of the arrows of the heat flux profile 382. As shown, the non-uniform heat flux profile 382 includes regions of relatively greater heat flux corresponding to the regions near the perimeter of the energy storage device where thermal loss may be greatest. The non-uniform heat flux profile 382 may also have regions of lower heat flux corresponding to interior portions of the energy storage device where thermal loss is reduced. The heat flux profile 382 may have a gradual transition as illustrated or may include one or more discrete levels. In one embodiment, the heat flux between a first region, such as near the perimeter, may be at least 15%, at least 25%, or at least 50% greater than the heat flux in a second region, such as an inferior portion. As shown, the thermal management device has the heat flux profile 382 illustrated in FIG. 23 that corresponds the thermal profile 370 of the energy storage device illustrated in FIG. 22. In this manner, an energy storage device may achieve a uniform cell temperature illustrated by thermal profile 390, even with heat loss 392 from the perimeter of the device. The temperature of energy storage cells in the interior portion 394 is maintained substantially the same as the temperate of the energy storage cells adjacent the perimeter where the heat loss 392 is greater. In various embodiments, the configuration of heater legs, or the position of the heater legs or heating elements may be adjusted to achieve the desired heat flux profile. In other embodiments, the thermal management device may include two or more independently controllable heating elements and a control system may be provided to operate the heating elements to achieve the desired heat flux profile.

Figure 25:
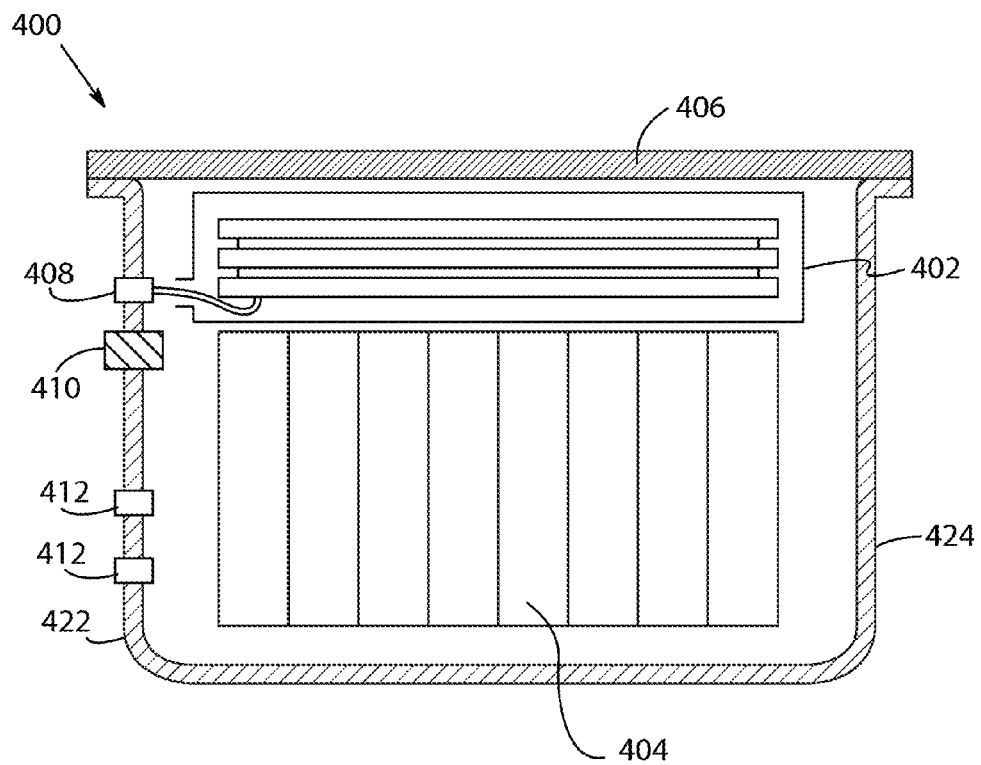
FIG. 25 is a cross-section of an energy storage device having a thermal management device.
Figure 26:
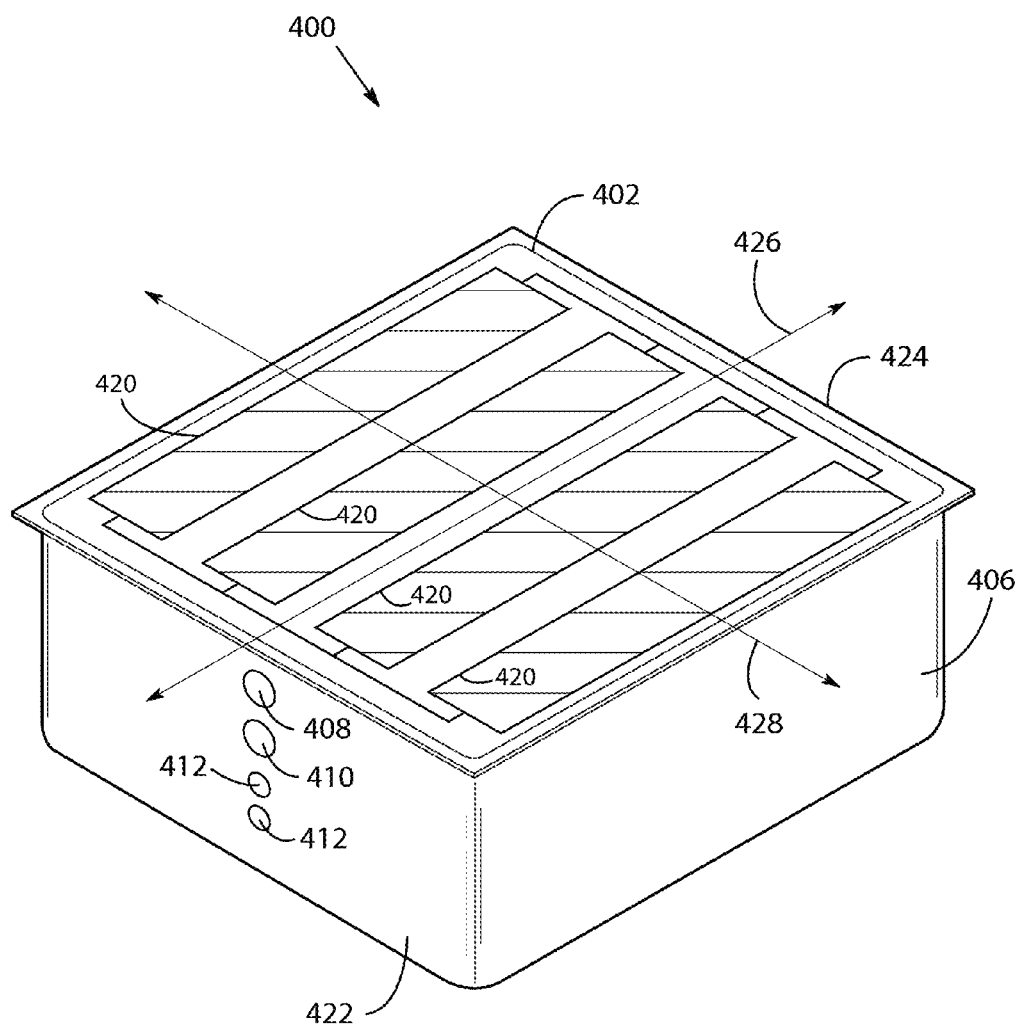
FIG. 26 is a perspective view of an energy storage device with the top cover removed.

FIGS. 25 and 26 show an embodiment of an energy storage device 400 having a thermal management device 402. The energy storage device 400 includes the thermal management device 402 and a plurality of energy storage cells 404 disposed within a battery enclosure 406. In one embodiment, the thermal management device 402 is positioned above the cells 404. In other embodiments however, the thermal management device is positioned below or between the cells. In yet another embodiment, two or more thermal management devices are provided within the battery enclosure to achieve the desired heating of the cells. In one embodiment, the cells are sodium-metal-halide cells having an operating temperature of approximately 300 degrees Celsius. During a startup phase, the thermal management device 402 provides a maximum heat output to heat the cells to the desired operating temperature. The heat output is then reduced or discontinued as necessary to maintain the cells within a desired operating range, such as between (and including) 280 degrees Celsius and 320 degrees Celsius.

In one embodiment, the battery enclosure 406 includes a lead wire aperture 408 for the lead wires of the thermal management device to exit the battery enclosure. The battery enclosure also includes a power connector 410 configured to connect the power and control signals from the energy storage cells and battery management system. In one embodiment, the battery enclosure also includes a pair of cooling ports 412 configured to transfer cooling fluid into and out of the battery enclosure to cool the energy storage cells 404 as needed during operation. In one embodiment, the lead wire aperture, power connector, and ports are located on a first side 422 of the battery enclosure that is opposite a second side 424 of the battery enclosure 406.

In some embodiments, it is desired to maintain all of the energy storage cells at a substantially uniform temperature even when one or more heater legs are inoperative, however, the thermal losses from the energy storage device may be asymmetric resulting in a temperature gradient across the energy storage cells. Referring now to FIG. 26, the energy storage device is illustrated with the heater legs of thermal management device 402 exposed. As shown, the thermal management device 402 has four heater legs 420, each wound in a spiral pattern around a mica panel or other insulator. The four heater legs 420 are electrically connected in parallel. The heater legs 420 are oriented to extend generally between the first side 422 and the second side 424 of the energy storage device. In one embodiment, the first side 422 of the energy storage device 400 has a greater thermal loss than the second side 424. For example, the presence of lead wire aperture 408, power connector 410, and cooling ports 412 extending through first side 422 may reduce the thermal resistance of first side 422 of the battery enclosure 406, thereby increasing the thermal loss through the first side. In other embodiments, the orientation of the energy storage cells 404 within battery enclosure 406 may result in a disproportionate thermal loss on one side of the energy storage device.

In another embodiment, the energy storage device 400 has a first axis 426 extending between opposing sides, such as first side 422 and second side 424. The energy storage device 400 also has a second axis 428 perpendicular to the first axis 426. In one embodiment, the temperature gradient across the energy storage cells 404 is greater along the first axis 426 than the temperature gradient across the energy storage cells 404 along the second axis 428. In this embodiment, the heater legs of the heating element may be aligned with the first axis 426. When all four heater legs are operational, the heat flux from the thermal management device to the energy storage cells is substantially uniform and the variation in temperature among the energy storage cells is reduced. However, in some embodiments, having the heater legs aligned with the first axis 42'6, between the first side 422 and the second side 424, may maintain a more uniform temperature distribution among the energy storage cells even when one or more of the heater legs is inoperative.

Figure 27:
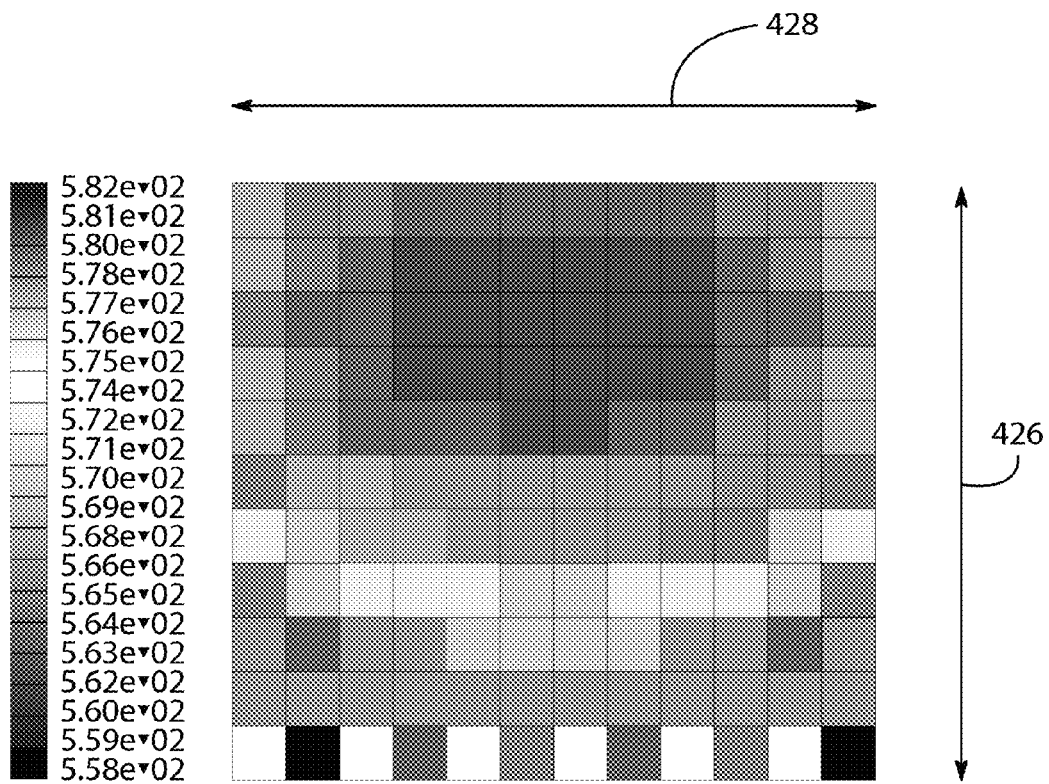
FIG. 27 is a simulated thermal profile of a battery having a thermal management device.

Referring now to FIG. 27, a simulated thermal profile in degrees Kelvin is illustrated for the cells of an energy storage device having a thermal management device. As illustrated, the energy storage cell temperature gradient is predicted to be greater along the first axis 426 than along the second axis 428. With uniform heat flux from the thermal management device, the maximum simulated temperature of the energy storage cells is 582 degrees Kelvin, while the minimum simulated cell temperature is 558 degrees Kelvin, resulting in a total variation in cell temperature of 24 degrees Kelvin, which may be within the acceptable range for the selected cell chemistry.

Figure 28:
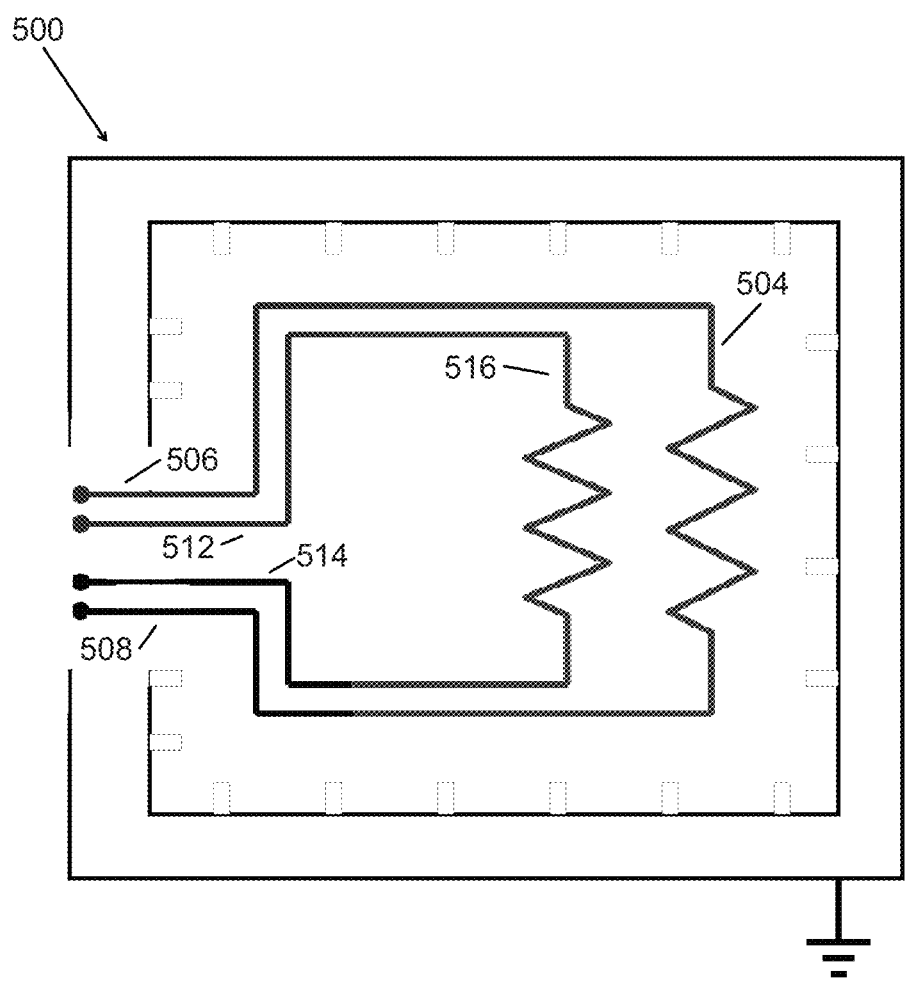
FIG. 28 is a schematic view of another thermal management device in a battery enclosure.

Referring to FIG. 28, also disclosed is a thermal management device 500 comprising a pair of heating elements in a stacked arrangement. The thermal management device 500 includes a first heating element 504 connected to a positive lead wire 506 and a negative lead wire 508. The thermal management device also includes a second heating element 516 connected to a positive lead wire 512 and a negative lead wire 514. In one embodiment, the first heating element 504 is operationally connected and used during operation of the thermal management device, while the second heating element 516 is not connected and is provided as a spare or backup heating element in the event of a failure of the first heating element. In this manner, the second heating element 516 provides a built in replacement or substitute for the first heating element 504. In this embodiment, the first heating element 504 and the second heating element 516 are each capable of providing the necessary heat flux to an application such that only one heating element is required for operation. In some applications, replacement of the thermal management device may not be feasible and having a spare heating element may provide a cost effective means of returning an application to a functional state after failure of a heating element.

As presently disclosed, a thermal management device provides improved reliability, and more uniform cell temperatures as compared to devices of the prior art. In the various embodiments, the thermal management device may achieve an operational life span matching or exceeding the twenty year life expectancy of certain rechargeable battery systems thereby reducing maintenance and repair costs.

In the appended claims, the terms "including" and "having" are used as the plain-language equivalents of the term "comprising"; the term "in which" is equivalent to "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A thermal management device comprising:
an insulator with a maximum use temperature of at least 200 degrees Celsius; and
a heating element comprising at least one heater leg, the heater leg contacting the insulator and configured to supply thermal energy,
the heating element having a pair of parallel lead wires connected to one pole of the heating element so as to provide a parallel electrical connection between the heater leg and a current source.

2. The thermal management device as claimed in claim 1, wherein the heating element comprises at least two heater legs electrically connected in parallel, and wherein the pair of parallel lead wires are configured to provide a parallel electrical connection between the heater legs and the current source.

3. The thermal management device as claimed in claim 1, wherein the heating element is one of a plurality of heating elements, the device comprising the plurality of heating elements.

4. The thermal management device as claimed in claim 1, wherein the insulator is a silicate.

5. The thermal management device as claimed in claim 4, wherein the silicate is a mica.

6. The thermal management device as claimed in claim 5, wherein the mica is a muscovite or a phlogopite.

7. The thermal management device as claimed in claim 1, wherein the insulator comprises a plurality of mica sheets secured by a retention device.

8. The thermal management device as claimed in claim 1, wherein the thermal management device has a substantially uniform heat flux over at least one surface of the device.

9. The thermal management device as claimed in claim 1, wherein the heating element is configured to provide heat flux over at least about 90% of one surface of the device.

10. The thermal management device as claimed in claim 1, wherein each of the at least one heater leg is configured to provide heat flux over at least about 90% of one surface of the device.

11. The thermal management device as claimed in claim 1, wherein the heating element is configured to provide a first heating region and a second heating region, wherein the first heating region has a heat flux at least 25% greater than a heat flux of the second heating region.

12. The thermal management device as claimed in claim 1, wherein the at least one heater leg comprises a nickel-chromium alloy resistive wire.

13. The thermal management device as claimed in claim 12, wherein the nickel-chromium alloy resistive wire is a nichrome wire.

14. The thermal management device as claimed in claim 1, wherein the pair of parallel lead wires comprise nickel-200 or nickel-201.

15. The thermal management device as claimed in claim 1, wherein the pair of parallel lead wires corresponds to a first pair of parallel lead wires connected to a first pole of the heating element, and further comprising a second pair of parallel lead wires connected to a second pole of the heating element.

16. The thermal management device as claimed in claim 1, wherein the pair of parallel lead wires are insulated with PTFE, polymide, phenolics, cement, ceramic, metal braided mesh, or combinations thereof.

17. The thermal management device as claimed in claim 1, wherein the pair of parallel lead wires have a mica-PTFE-fiberglass insulation with a maximum use temperature of at least 400 degrees Celsius.

18. The thermal management device as claimed in claim 1, further comprising a strain relief attached to the insulator, wherein the pair of parallel lead wires are connected to the strain relief.

19. The thermal management device as claimed in claim 18, wherein the pair of parallel lead wires are connected to the strain relief by a weld and by a mechanical connection.

20. The thermal management device as claimed in claim 1, wherein the insulator comprises an insulator panel defining a plurality of apertures and the pair of parallel lead wires are laced through the apertures to provide a strain relief for the pair of parallel lead wires.

21. The thermal management device as claimed in claim 1, further comprising a housing surrounding the insulator and the heating element, the housing having an outer surface that is at least electrically insulating at 200 degrees Celsius.

22. The thermal management device as claimed in claim 1, wherein the thermal management device is minimally bound by a rectangular parallelepiped boundary defined by three perpendicular axes, wherein a shortest of the axes is no more than 10 millimeters.

23. A thermal management device comprising:
an insulator with a maximum use temperature of at least 200 degrees Celsius, the insulator comprising an interior insulation panel and an exterior insulation panel;
a strain relief including at least one channel in the interior insulation panel and at least one hole in the exterior insulation panel; and a heating element comprising at least one heater leg, the heater leg contacting the insulator and configured to supply thermal energy, the heating element having lead wires configured to provide a parallel electrical connection between the heater leg and a current source, wherein at least one of the lead wires are routed through the at least one channel and the at least one hole.

* * * * *